United States Patent
Wang et al.

(10) Patent No.: US 12,509,797 B2
(45) Date of Patent: Dec. 30, 2025

(54) METHOD OF FABRICATING METAL-NITRIDE VERTICALLY ALIGNED NANOCOMPOSITES

(71) Applicant: Purdue Research Foundation, West Lafayette, IN (US)

(72) Inventors: Haiyan Wang, West Lafayette, IN (US); Xuejing Wang, West Lafayette, IN (US); Xinghang Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 763 days.

(21) Appl. No.: 17/134,340

(22) Filed: Dec. 26, 2020

(65) Prior Publication Data

US 2021/0214857 A1    Jul. 15, 2021

Related U.S. Application Data

(60) Provisional application No. 62/959,944, filed on Jan. 11, 2020.

(51) Int. Cl.
| | | |
|---|---|---|
| C30B 29/60 | (2006.01) | |
| C30B 23/02 | (2006.01) | |
| C30B 23/06 | (2006.01) | |
| C30B 29/02 | (2006.01) | |
| C30B 29/38 | (2006.01) | |
| G02B 1/00 | (2006.01) | |
| G02B 5/00 | (2006.01) | |

(52) U.S. Cl.
CPC .......... *C30B 29/605* (2013.01); *C30B 23/025* (2013.01); *C30B 23/066* (2013.01); *C30B 29/02* (2013.01); *C30B 29/38* (2013.01); *G02B 1/002* (2013.01); *G02B 5/008* (2013.01)

(58) Field of Classification Search
None
See application file for complete search history.

(56) References Cited

U.S. PATENT DOCUMENTS

| | | | |
|---|---|---|---|
| 2010/0126566 A1* | 5/2010 | Ji | G02B 5/008 |
| | | | 359/326 |
| 2016/0190403 A1* | 6/2016 | Verschuuren | H01L 33/504 |
| | | | 257/98 |

FOREIGN PATENT DOCUMENTS

| | | | | |
|---|---|---|---|---|
| WO | WO-2018142339 A1 * | 8/2018 | | G02B 1/002 |

OTHER PUBLICATIONS

Wang et al., "Hybrid plasmonic Au—TiN vertically aligned nanocomposites: a nanoscale platform towards tunable optical sensing", Nov. 27, 2018, Nanoscale Advances, vol. 1 pp. 1045-1054 and Supplementary Information pp. 1-13 (Year: 2018).*

(Continued)

*Primary Examiner* — Seth Dumbris
(74) *Attorney, Agent, or Firm* — Piroozi-IP, LLC

(57) ABSTRACT

A method of the fabricating a metal-nitride vertically aligned nanocomposites is disclosed which includes applying a pulsed laser onto a composite target, the composite target including a two-phase metal-nitride plasmonic nanostructure, depositing adatoms of the composite target onto a substrate, and nucleating metal over the substrate and growing metal and nitride thereover until a predetermined size of vertically aligned metal nitride nanocomposite is achieved including metal nanorods embedded in nitride.

5 Claims, 30 Drawing Sheets

(56) References Cited

OTHER PUBLICATIONS

Schuller et al., Plasmonics for extreme light concentration and manipulation, Nat. Mater., 2010, 9(3), 193-204.
Atwater et al., Plasmonics for improved photovoltaic devices, Nat. Mater., 2010, 9(3), 205-213.
Anker et al., Biosensing with plasmonic nanosensors, Nat. Mater., 2008, 7(6), 442-453.
Boltasseva et al., Low-Loss Plasmonic Metamaterials, Science, 2011, 331(6015), 290-291.
Soukoulis et al., Past achievements and future challenges in the development of three-dimensional photonic metamaterials, Nat. Photonics, 2011, 5(9), 523-530.
Shen et al., Optical Broadband Angular Selectivity, Science, 2014, 343(6178), 1499-1501.
Gui et al., Nonlinear Refractory Plasmonics with Titanium Nitride Nanoantennas, Nano Lett., 2016, 16(9), 5708-5713.
Li et al., Refractory Plasmonics with Titanium Nitride: Broadband Metamaterial Absorber, Adv. Mater., 2014, 26(47), 7959.
Huang et al., Nanoscale Artificial Plasmonic Lattice in Self-Assembled Vertically Aligned Nitride-Metal Hybrid Metamaterials, Adv. Sci., 2018, 5(7), 9.
Wang et al., Self-Assembled Ag—TiN Hybrid Plasmonic Metamaterial: Tailorable Tilted Nanopillar and Optical Properties, Adv. Opt. Mater., 2018.
Jahani et al., All-dielectric metamaterials, Nat. Nanotechnol., 2016, 11(1), 23-36.
Li et al., Self-Assembled Epitaxial Au-Oxide Vertically Aligned Nanocomposites for Nanoscale Metamaterials, Nano Lett., 2016, 16(6), 3936-3943.
Gao et al., Template Free Growth of Well-Ordered Silver Nano Forest/Ceramic Metamaterial Films with Tunable Optical Responses, Adv. Mater., 2017, 29(16), 8.
Zilio et al., Hybridization in Three Dimensions: A Novel Route toward Plasmonic Metamolecules, Nano Lett., 2015, 15(8), 5200-5207.

* cited by examiner

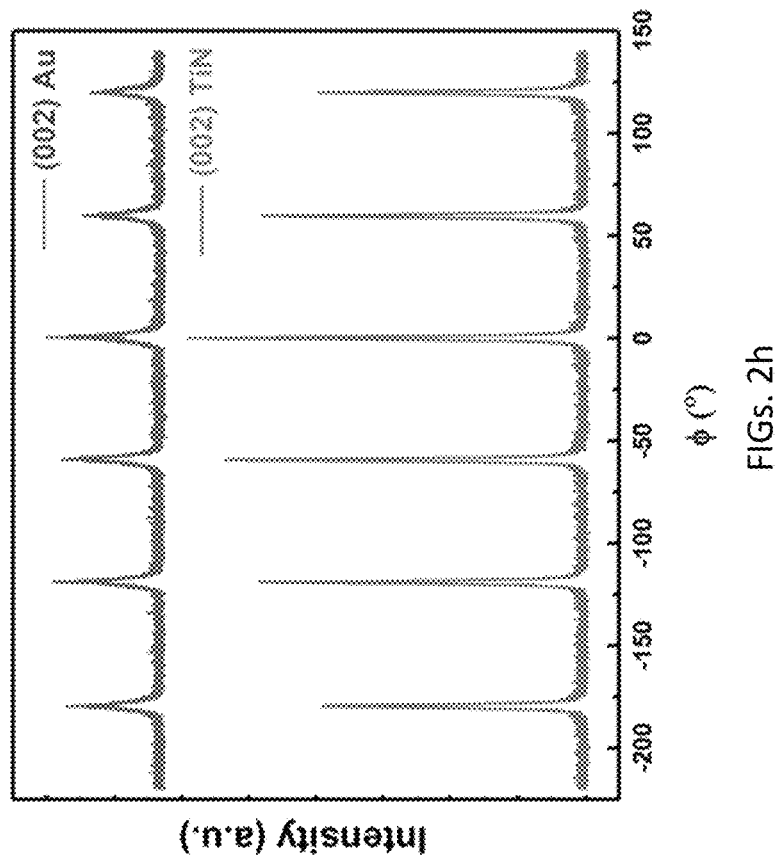
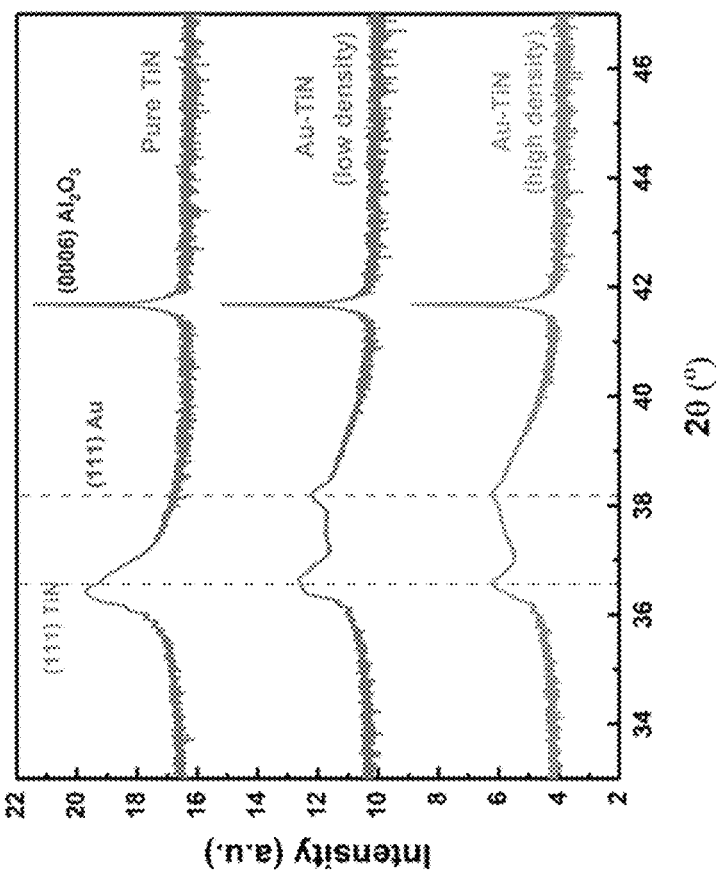
FIGs. 2h
FIGs. 2g

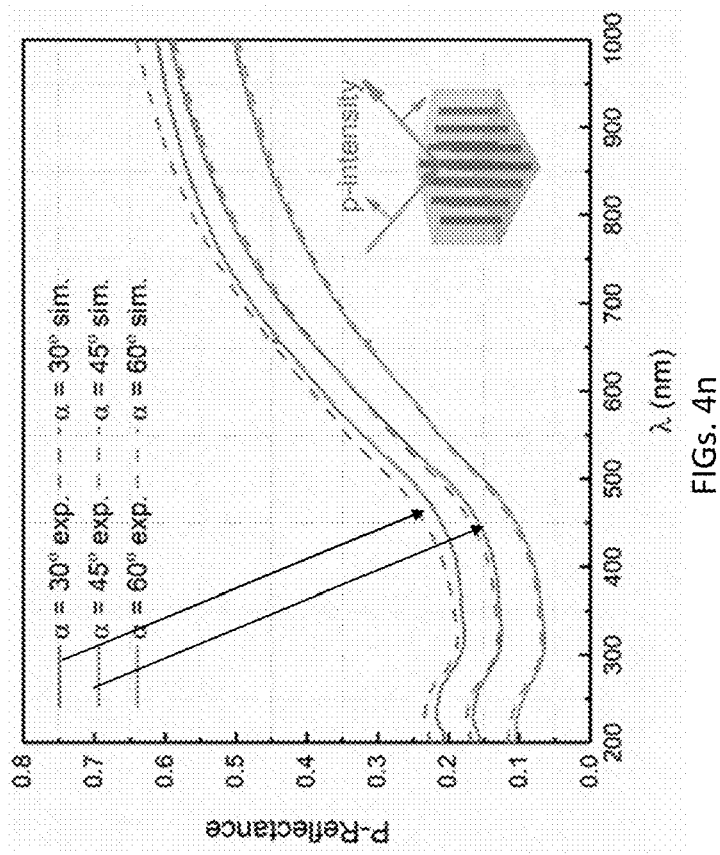
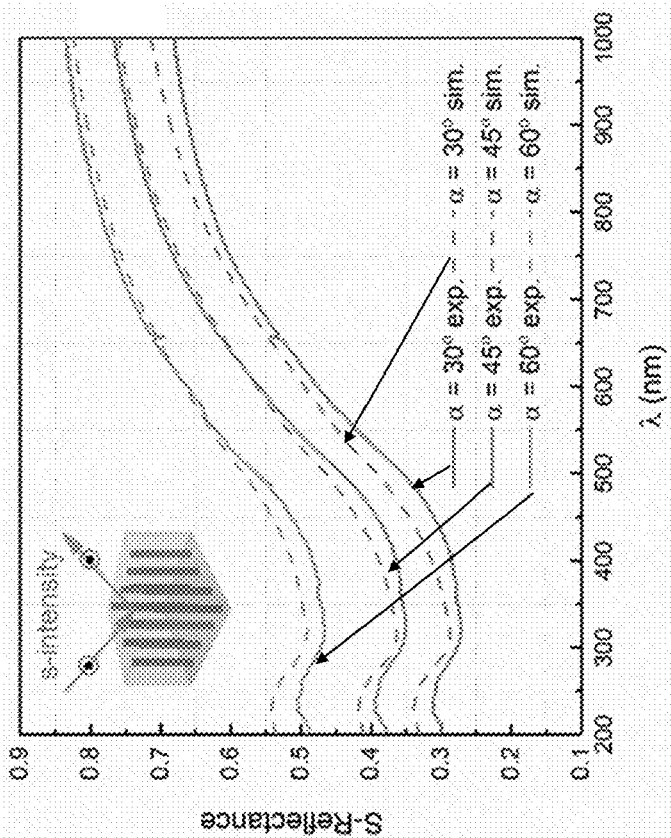
FIGs. 4m
FIGs. 4n

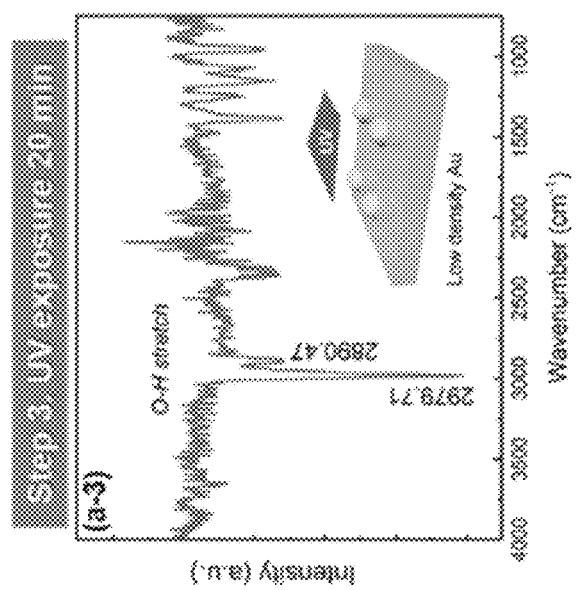
FIG. 5a3
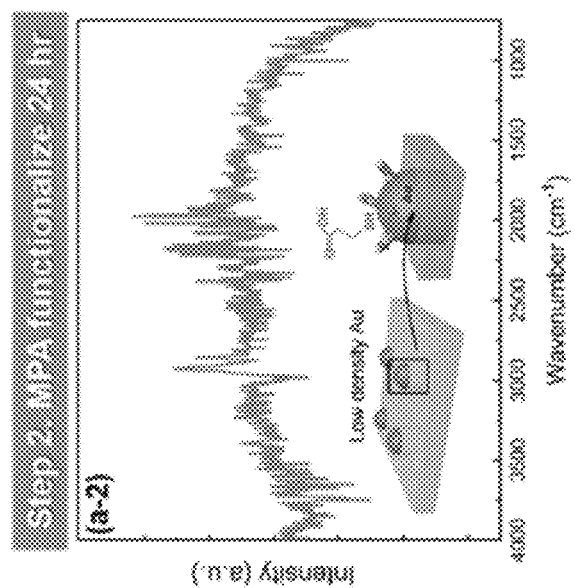
FIG. 5a2
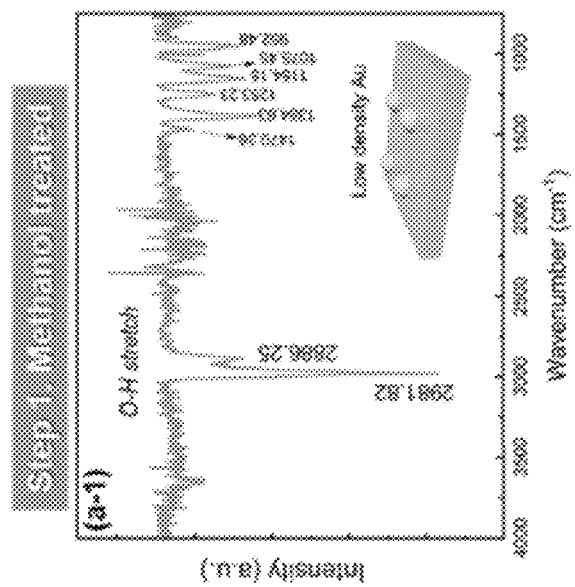
FIG. 5a1
FIGs. 5a1, 5a2, 5a3

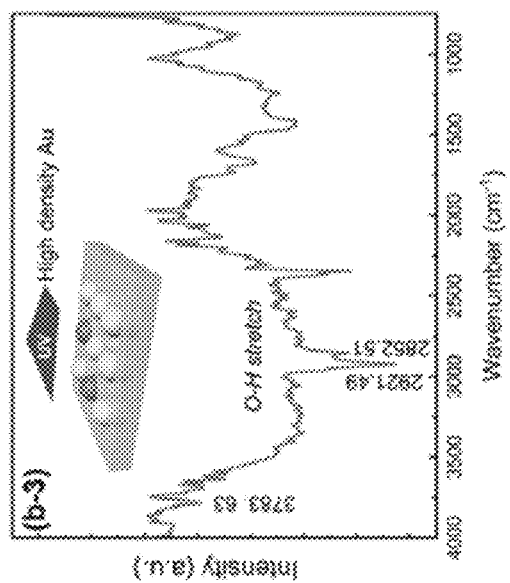
FIG. 5b3
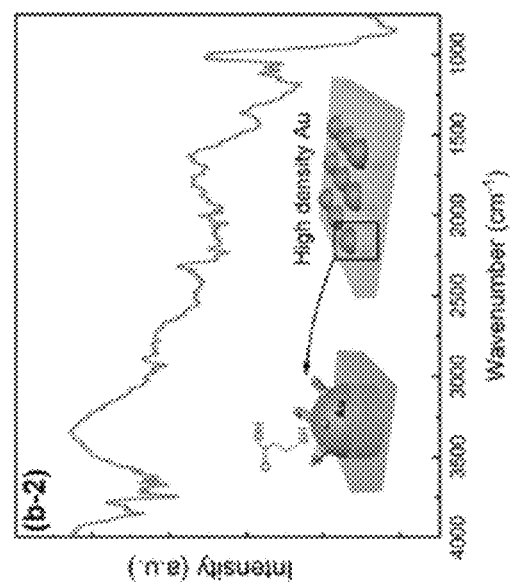
FIG. 5b2
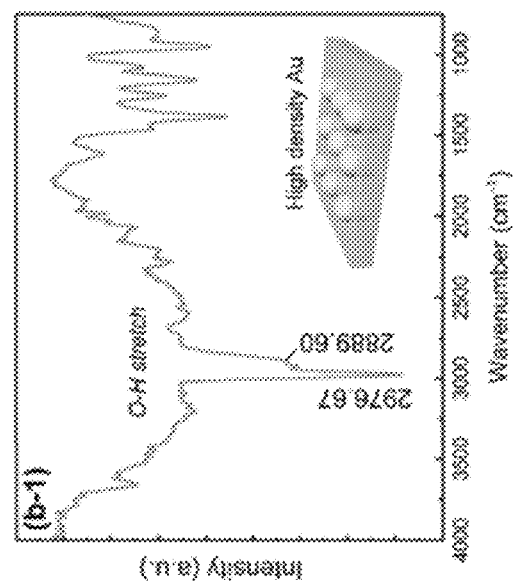
FIG. 5b1

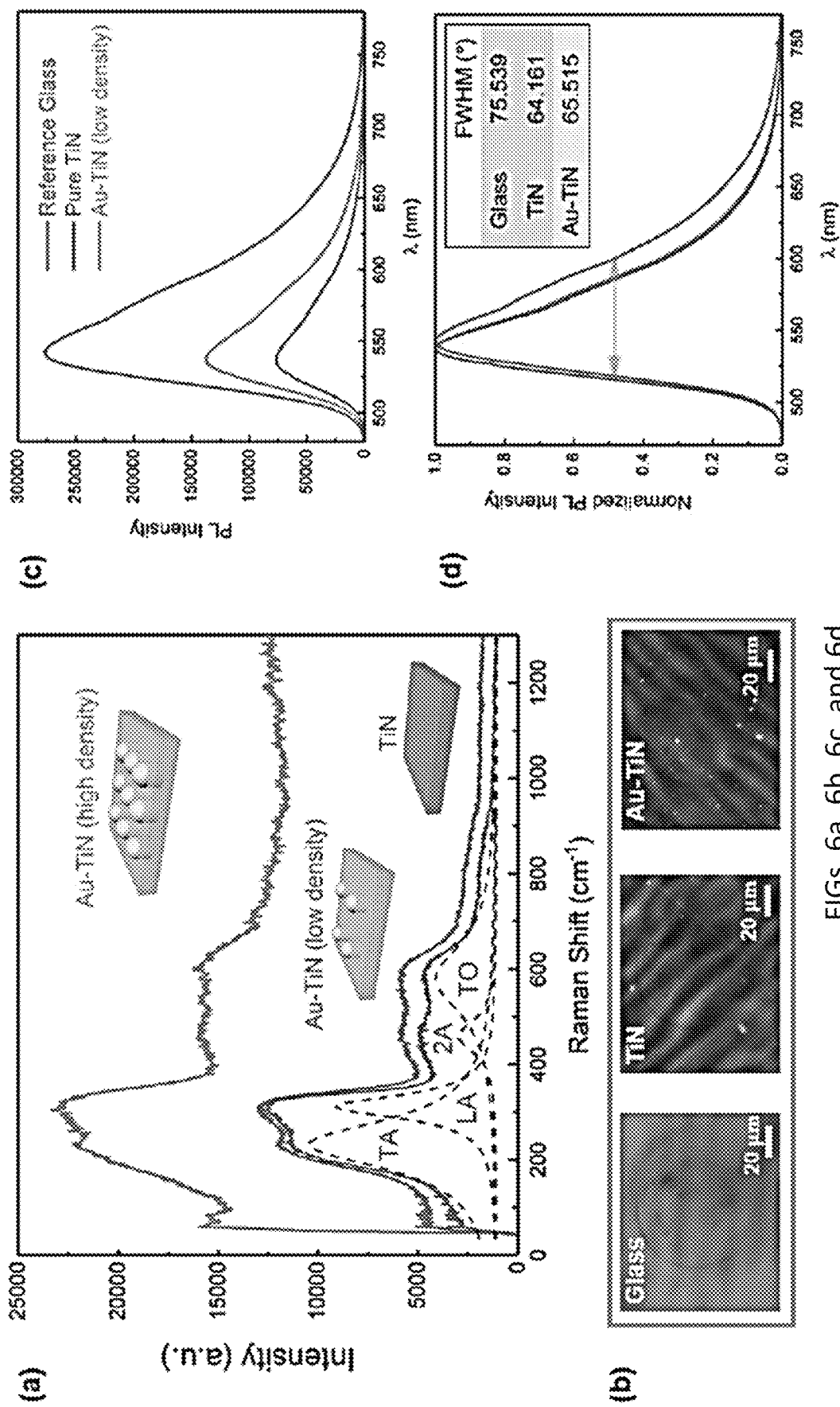
FIGs. 6a, 6b, 6c, and 6d

METHOD OF FABRICATING METAL-NITRIDE VERTICALLY ALIGNED NANOCOMPOSITES

CROSS-REFERENCE TO RELATED APPLICATIONS

The present patent application is related to and claims the priority benefit of U.S. Provisional Patent Application Ser. No. 62/959,944, filed Jan. 11, 2020, the contents of which are hereby incorporated by reference in its entirety into the present disclosure

STATEMENT REGARDING GOVERNMENT FUNDING

This invention was made with government support under DMR 1565822 and DMR-2016453 awarded by the National Science Foundation. The government has certain rights in the invention.

TECHNICAL FIELD

The present disclosure generally relates to method of fabricating nanostructures, and in particular, to a method of fabricating metal-nitride vertically aligned nanocomposites.

BACKGROUND

This section introduces aspects that may help facilitate a better understanding of the disclosure. Accordingly, these statements are to be read in this light and are not to be understood as admissions about what is or is not prior art.

Nanostructures with plasmonic effects have seen an appreciable amount of attention. Plasmonic effects offered by metallic nanostructures in subwavelength scale enable robust light confinement or directional light routing that are unprecedented as compared to such light effects from bulk counterparts. Specifically, taking advantage of plasmonic metallic nanostructures, localized surface plasmon resonance (LSPR) imaging and surface enhanced Raman scattering (SERS) overcome the detection limit of conventional spectroscopies in biological and chemical sensing. Such technologies can be used to even allow single-molecule-level detection.

A key aspect in the field of plasmonic nanostructures is to manipulate light-matter interactions for optical tunability. Such tunability, achieved by tailoring the dimension, geometry and concentration of the metallic nanostructures, helps to meet crucial control requirements for photonic devices, such as resonant frequency, polarization angle or propagation directions. Considering the device applications using metallic plasmonic materials (e.g. gold (Au), silver (Ag), aluminum (Al), or copper (Cu)), require additional key aspects to be addressed including thermal and mechanical stabilities, materials compatibility and optical losses. To this end, new plasmonic materials such as transition metal-nitrides (i.e. titanium-nitride (TiN) and tantalum-nitride (TaN)) have been shown to be low-loss plasmonic candidates with comparable optical properties to noble metals (i.e. Au and Ag), but more mechanically and thermally stable.

However, what is needed is the ability to allow tunability of optical properties including both anisotropic properties as well as plasmonic frequency.

Therefore, there is an unmet need for a new method of fabricating metal-nitride nanostructures that can provide tunability of various plasmonic properties.

SUMMARY

A method of the fabricating a metal-nitride vertically aligned nanocomposites is disclosed. The method includes applying a pulsed laser onto a composite target, the composite target including a two-phase metal-nitride plasmonic nanostructure. The method also includes depositing adatoms of the composite target onto a substrate, and nucleating metal over the substrate and growing metal and nitride thereover until a predetermined size of vertically aligned metal nitride nanocomposite is achieved including metal nanorods embedded in nitride.

According to one embodiment, the nitride includes one or more of TiN, TaN, ZrN, GaN, AlN, HfN, and a combination thereof.

The method of claim 1, wherein the metal includes one or more of Au, Ag, Pt, Ni, Co, Cu, Fe, Al, and a combination thereof.

According to one embodiment, the substrate includes a single crystalline oxide substrate.

According to one embodiment, the single crystalline oxide substrate include one or more of $SrTiO_3$, $LaAlO_3$, $Al_2O_3$, MgO, Si, glass, mica, and a combination thereof.

According to one embodiment, the predetermined size of the vertically aligned metal nitride nanocomposite has a diameter of between about 2 and about 20 nm.

According to one embodiment, the predetermined size of the vertically aligned metal nitride nanocomposite has a length of between about 2 nm to about 1 μm.

According to one embodiment, the metal nitride nanocomposite has a density defined by interspacing between the metal nanorods of between about 4 nm to about 6 nm.

According to one embodiment, the nitride growth is in a vacuum.

According to one embodiment, the vacuum is about 200 mtorr.

According to one embodiment, the nitride growth is at an elevated temperature.

According to one embodiment, the elevated temperature is between about 600 to about 800° C.

According to one embodiment, the pulsed laser energy is between about 350 mJ to about 450 mJ.

A plasmonic nanocomposite structure is also disclosed. The plasmonic nanocomposite structure includes a substrate, and a plurality of metal nanopillar of a predetermined length embedded in a nitride disposed on the substrate.

According to one embodiment, the substrate includes a nitride layer disposed thereon with metal seeds provided as small islands dispersed over the substrate.

According to one embodiment, the nitride includes one or more of TiN, TaN, ZrN, GaN, AlN, HfN, and a combination thereof.

According to one embodiment, the metal includes one or more of Au, Ag, Pt, Ni, Co, Cu, Fe, Al, and a combination thereof.

According to one embodiment, According to one embodiment, the substrate includes a single crystalline oxide substrate.

According to one embodiment, the single crystalline oxide substrate include one or more of $SrTiO_3$, $LaAlO_3$, $Al_2O_3$, MgO, Si, glass, mica, and a combination thereof.

According to one embodiment, the predetermined size of the vertically aligned metal nitride nanocomposite has a diameter of between about 2 and about 20 nm.

According to one embodiment, the predetermined size of the vertically aligned metal nitride nanocomposite has a length of between about 2 nm to about 1 μm.

According to one embodiment, the metal nitride nanocomposite has a density defined by interspacing between the metal nanorods of between about 4 nm to about 6 nm.

A multilayer plasmonic nanocomposite structure is also disclosed. The multilayer plasmonic nanocomposite structure includes a substrate, and a plurality of metal nitride layers disposed on the substrate, each layer including a metal nanopillar of a predetermined length embedded in a nitride.

According to one embodiment, the substrate includes a nitride layer disposed thereon with metal seeds provided as small islands dispersed over the substrate.

According to one embodiment, the nitride includes one or more of TiN, TaN, ZrN, GaN, AlN, HfN, and a combination thereof.

According to one embodiment, the metal includes one or more of Au, Ag, Pt, Ni, Co, Cu, Fe, Al, and a combination thereof.

According to one embodiment, the substrate includes a single crystalline oxide substrate which includes one or more of $SrTiO_3$, $LaAlO_3$, $Al_2O_3$, MgO, Si, glass, mica, and a combination thereof.

According to one embodiment, the predetermined size of the vertically aligned metal nitride nanocomposite has a diameter of between about 2 and about 20 nm, the predetermined size of the vertically aligned metal nitride nanocomposite has a length of between about 2 nm to about 1 μm, and the metal nitride nanocomposite has a density defined by interspacing between the metal nanorods of between about 4 nm to about 6 nm.

BRIEF DESCRIPTION OF DRAWINGS

FIG. 2g is an intensity vs. 2θ, shows a $\theta$-$2\theta$ scans of the samples grown on (0001) sapphire substrates, with films oriented as (111) for better lattice match.

FIG. 2h is a plot of intensity vs. φ shows a phi scan of films grown on sapphire, indicating a hexagonal (six-fold) symmetry of (111) Au and (111) Ti.

FIGS. 5a1, 5a2, 5a3, 5b1, 5b2, and 5b3 provide intensity vs. wavelength graphs showing application of chemical sensing.

FIGS. 6a provide Raman spectra as an enhanced plasmonic response of the Au-TIN hybrid metasurfaces, collected for pure TIN, low and high density Au—TiN films.

FIG. 6b provides photoluminescence (PL) images of plasmonic films showing weaker fluorescence from the conjugated polymer layer of an experimental construction.

FIGS. 6c-6d show PL intensity vs. wavelength (FIG. 6c) and normalized PL intensity vs. wavelength (FIG. 6d) for different structures including glass as reference, pure TiN as reference, and Au—TiN (low density).

FIG. 8a is a schematic illustrations to show the design of multilayers with Au nanowires on Si. STEM images of the design shown in FIG. 8a are provided in FIGS. 8b for Au—TaN/Au-TIN multilayer, shown in FIG. 8c for Au—TaN/Au-TIN×2 multilayer, shown in FIG. 8d for Au—TaN/Au—TiN×3 multilayer, and shown in FIG. 8e for Au—TaN/Au—TiN×4 multilayer, all of which are shown on Si as the substrate.

FIG. 9a is a 3D diagram generated from plan-view and cross sectional STEM images to demonstrate the nanocomposite structure of the second embodiment according to the present disclosure.

FIG. 9b is a plan-view STEM image (in high angle annular dark field [HAADF] mode) in a typical area of the structure of FIG. 9a.

FIG. 9c is a corresponding energy-dispersive X-ray spectroscopy (EDS) elemental mapping of a selected area of FIG. 9a.

FIG. 9d is a high-resolution STEM image to show the high quality of the film and the size of the Au nanopillars FIG. 9e is a high-resolution TEM image of a representative Au nanopillar of FIG. 9a.

FIGS. 9f and 9g are cross-sectional STEM and EDS mapping, respectively, of an example nanocomposite of FIG. 9a to further confirm the vertical growth of Au nanopillars in both Au—TiN and Au—TaN layers.

FIG. 9h is a cross-sectional STEM mapping of an example nanocomposite of FIG. 9a showing continued growth of Au nanopillars can be identified from layer to layer, suggesting the preferred nucleation of Au pillars in TiN matrix.

FIG. 9i is a selected area electron diffraction (SAED) pattern of a the structure shown in FIG. 9a, which exhibits distinguished Au (002), TiN (002), and TaN (002) diffraction dots.

DETAILED DESCRIPTION

Figures 1A, 1B, 1C, 1D, 1E, 1F:
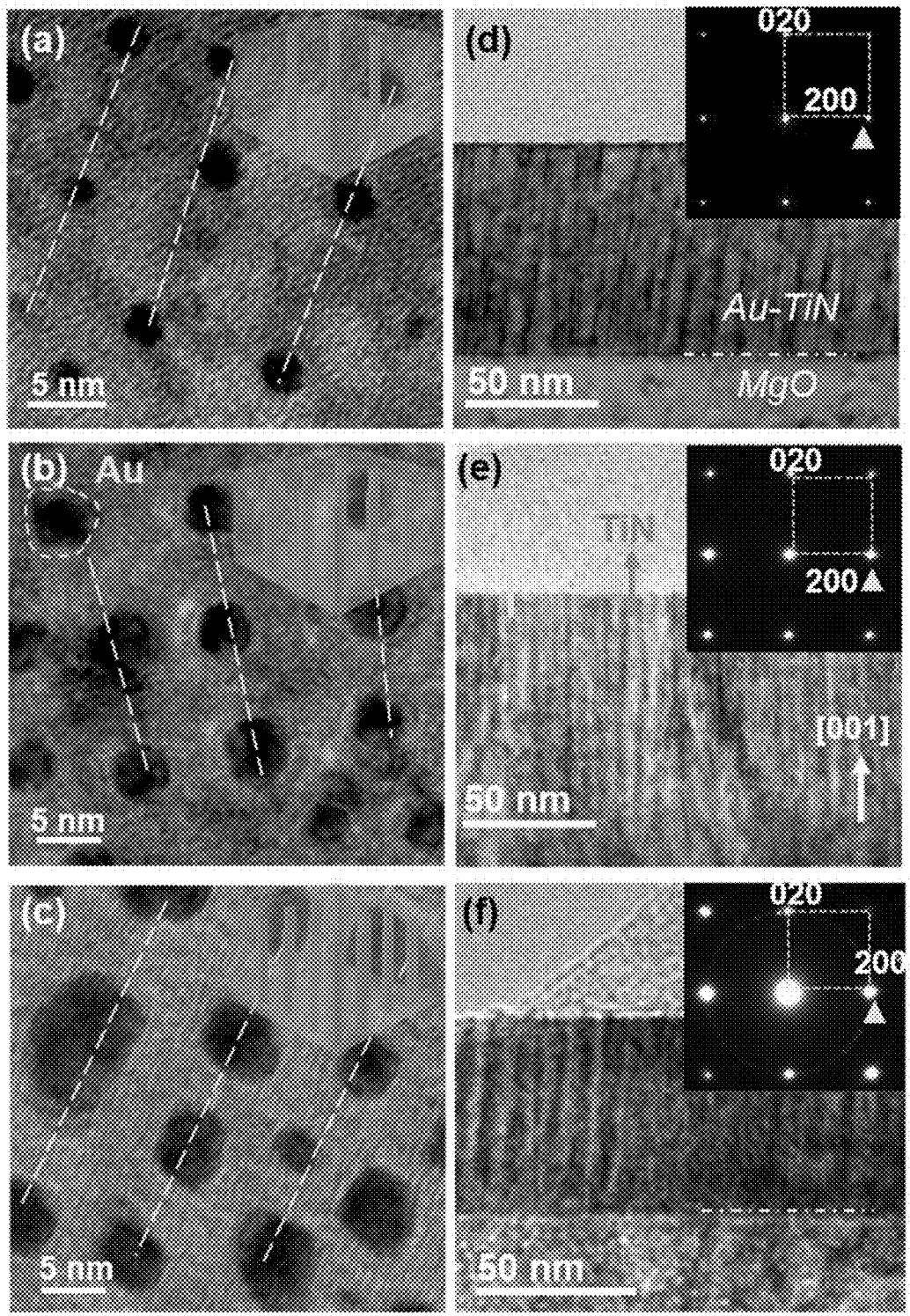
FIGS. 1a-1c are plan-view transmission electron microscopy (TEM) images of nanostructures of the present disclosure from top projections where the dashed lines mark the ordering of the nanopillars.
FIGS. 1d-1f are schematic depicting gradual increase of Au nanopillar density with the diffraction patterns (insets) from (100) zone axis.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

In the present disclosure, a fabrication method is disclosed to achieve a two-phase metal-nitride (e.g., Au—TiN) hybrid plasmonic nanostructure with tailorable meal (e.g., Au) nanopillar (also referred to herein as nanorods) density and tunable optical properties. Both metal and the nitride phases are grown epitaxially with high crystalline quality and near perfect stoichiometry with no apparent interdiffusion in between. The addition of tailorable Au phase enables optical tunability and enhanced anisotropy, including the plasmonic red shift and systematic tuning of the complex dielectric constants (31 and 32) in a broad wavelength range from 210 to 2500 nm. Also, the plasmon frequency is effectively tuned as the metal density varies, which correlates to its internal carrier density variation of the metallic nanostructures. As compared to colloidal metal-only nanoparticles (NPs) or nanorods (NRs), the structures fabricated according to the present disclosure based on the high chemical sensitivity and plasmon enhanced properties of the nanocomposite structures based on the Fourier transform infrared spectroscopy (FTIR), Raman and photoluminescence (PL) measurements demonstrate advantageous metal-nitride hybrid thin film as robust and reusable functional SERS substrates for sensing and nanophotonic devices.

The following discussion repeatedly refers to gold (Au) and titanium nitride (TiN) as the material choice, however, it should be appreciated that a number of other materials are within the ambit of the present disclosure and no limitation as to the choice of materials is intended by the frequency discussion of Au and TiN. Further discussion of such other materials and structures are provided below.

Towards this end, according to the present disclosure, a novel metal-nitride plasmonic material design with tailorable microstructures is presented as a tailorable hybrid material platform for tunable optical properties. The self-assembled hybrid film includes high density, well distributed vertically aligned Au (or other metal) nanopillars in the low loss titanium nitride (TiN) matrix. Both Au and TiN are plasmonic materials with plasmonic responses in neighboring wavelength regimes. The method of the present disclosure effectively controls the Au nanopillar density, i.e. inter-spacing of the nanopillars, and thus enable tunability of the metasurface morphology. Such tailorable hybrid thin film is expected to change the charge carrier distributions and optical properties, advantageously. Compared to the nanopillars (nanowires) grown by prior art solution-based or CVD-based methods, the self-assembled metal-nitride hybrid material platform fabricated according to the methods of the present disclosure serves as a novel approach in realizing hybrid plasmonic materials with well-controlled pillar morphology and density tuning. Taking advantage of such tunable Au—TiN hybrid plasmonic material, potential applications as molecule sensing based on FTIR measurements, enhanced Raman scattering, and enhanced PL signal have been are also demonstrated.

As a guide, the following division of figures is provided in order to streamline the understanding of the present disclosure. Two embodiments are described in the present disclosure: 1) two-phase metal-nitride hybrid plasmonic nanostructure; and 2) a multi-layer metal-nitride hybrid plasmonic nanostructure. With respect to the first embodiment, the figures of the present disclosure are divided into three categories: 1) figures depicting and describing the nanostructure according to the present disclosure (FIGS. 1a, 1b, 1c, 1d, 1e, 1f, 1g, 1h, 1i, 1j, 1k, 1l, 1m, 2a, 2b, 2c, 2d, 2e, 2f, 2g, 2h, 4g, 4h, 4i, 4j, and 7); 2) figures depicting and describing plasmonic properties of the nanostructures according to the present disclosure (FIGS. 3a, 3b, 3c, 3d, 3e, 3f, 4a, 4b, 4c, 4d, 4k, 4l, 4m, 4n, 4o, 4p, 4q, 4r, 4s, 4t, 4u, 4v, 5a1, 5a2, 5a3, 5b1, 5b2, 5b3, 6a, 6b, 6c, and 6d); and 3) figures depicting and describing electrical properties of the nanostructures according to the present disclosure (FIGS. 4e, 4f, 4w, 4x, 4y, and 4z). With respect to the second embodiment, FIGS. 8a, 8b, 8c, 8d, 8e, 9a, 9b, 9c, 9d, 9e, 9f, 9g, 9h, 9i, 10a, 10b, 10c, 10d, 11a, 11b, 11c, 11d, 11e, and 11f depict and describe the aforementioned multi-layer metal-nitride hybrid plasmonic nanostructures according to the present disclosure.

Figure 1G:
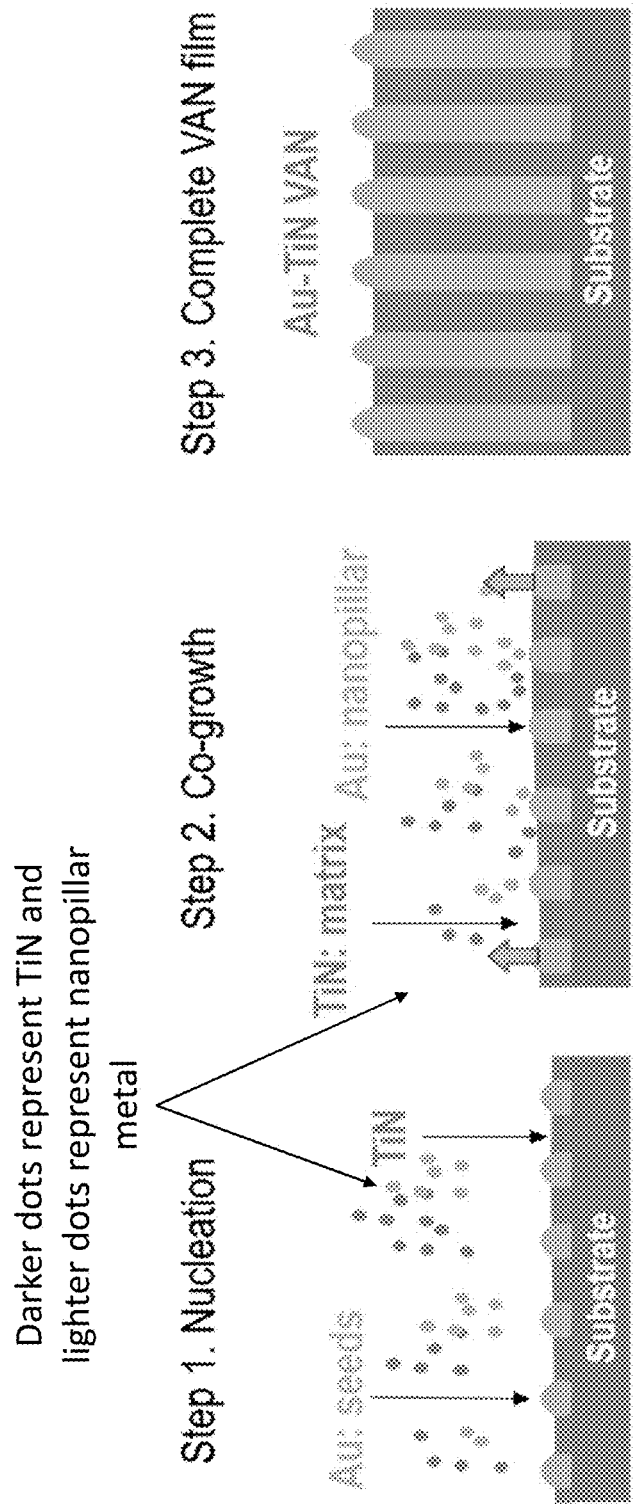
FIG. 1g is a schematic of a growth mechanism of Au—TiN vertically aligned nanocomposite (VAN), according to the present disclosure.

To verify the overall 3D nature of the Au nanopillars in the TiN matrix, a set of transmission electron microscopy (TEM) studies have been conducted on both the plan-view and cross-section TEM specimens for three different Au nanopillar densities. Three dimensional microstructure of Au-TIN nanocomposites grown on MgO substrates with tailored Au density are provided in reference to FIGS. 1a-1f. Referring to FIGS. 1a-1c, plan-view TEM images from top projections are provided where the dashed lines mark the ordering of the nanopillars. Referring to FIGS. 1d-1f schematic illustrations with gradual increase of Au nanopillar density are shown, with the diffraction patterns (insets) from (100) zone axis. As shown in FIGS. 1a-1f, it can clearly be seen that the Au nanopillars are growing vertically and uniformly in the TiN matrix for all cases, following the trend as marked (dashed lines) in the inset plan-view images (see FIGS. 1a-1c). The Au—TiN nanocomposite grown by the one step growth method provides the advantage of growing high crystalline nanopillar assemblies with confined diameters (average diameter of 6 nm). Selected Area Electron Diffraction (SAED) patterns are displayed as inserts in FIGS. 1d-1f, from which a cube-on-cube epitaxy is confirmed for both Au and TiN phases on MgO substrates. These two phases (Au and TiN) are well separated with sharp interfaces in between. Based on the surface energy of the phases and the substrates, Au nucleates on MgO as the Volmer-Weber (VW) island and TiN nucleates as Stranski-Krastanov (2D+3D) mode, respectively, as understood by a person having ordinary skill in the art. An illustration of the vertically aligned nanocomposite (VAN) self-assembling process is described in FIG. 1g which provides schematic of a growth mechanism of Au—TiN vertically aligned nanocomposite (VAN), according to the present disclosure. Shown in FIG. 1g are three steps. As alluded to above, in these steps, while the discussion provided is based on TiN and Au deposited on an MgO substrate, it should be appreciated that other materials can be used and which are within the ambit of the present disclosure. For example, example nitride includes one or more of TiN, TaN, ZrN, GaN, AlN, HfN, and a combination thereof. The metal includes one or more of Au, Ag, Pt, Ni, Co, Cu, Fe, Al, and a combination thereof. The substrate includes a single crystalline oxide substrate, wherein the single crystalline oxide substrate include one or more of $SrTiO_3$, $LaAlO_3$, $Al_2O_3$, MgO, Si, glass, mica, and a combination thereof.

Referring to FIG. 1g, in step 1, Au nucleation is shown as small islands used as a seed layer. In step 2, TiN and Au co-growth of initial VAN layer is shown, where TiN forms the matrix layer and Au nucleates on top of the seed layer forming nanopillars. In step 3, completed VAN film is shown, with smooth surface and protruded Au nanopillars. The initial nucleation is an important steps of growth morphology for the Au—TiN hybrid thin films. Au has a higher surface energy, and it nucleates as small islands as the Au nucleus. Here, the Au island spacing is mainly controlled by the Au density in the target. TiN grows as the matrix as it favors the layered growth. As the growth continues, the Au absorbed atoms (adatoms) stack on top of each other. The high kinetic energy during growth plays a role in forming straight pillars and limit the lateral diffusion of the adatoms. In addition, the strain between the Au and TiN phases and the substrate MgO also play a role in the overall arrangement of the Au nanopillars. TiN (a=4.24 Å) presents a nearly perfect lattice match on MgO (a=4.21 Å) with a minor in-plane compressive strain, while Au (a=4.065 Å) presents an in-plane tensile strain on MgO. The possible in-plane strain compensation among the Au nanopillars and the TiN matrix also plays a role in the overall pillar distribution on the substrate.

Figures 1H, 1I, 1K, 1L:
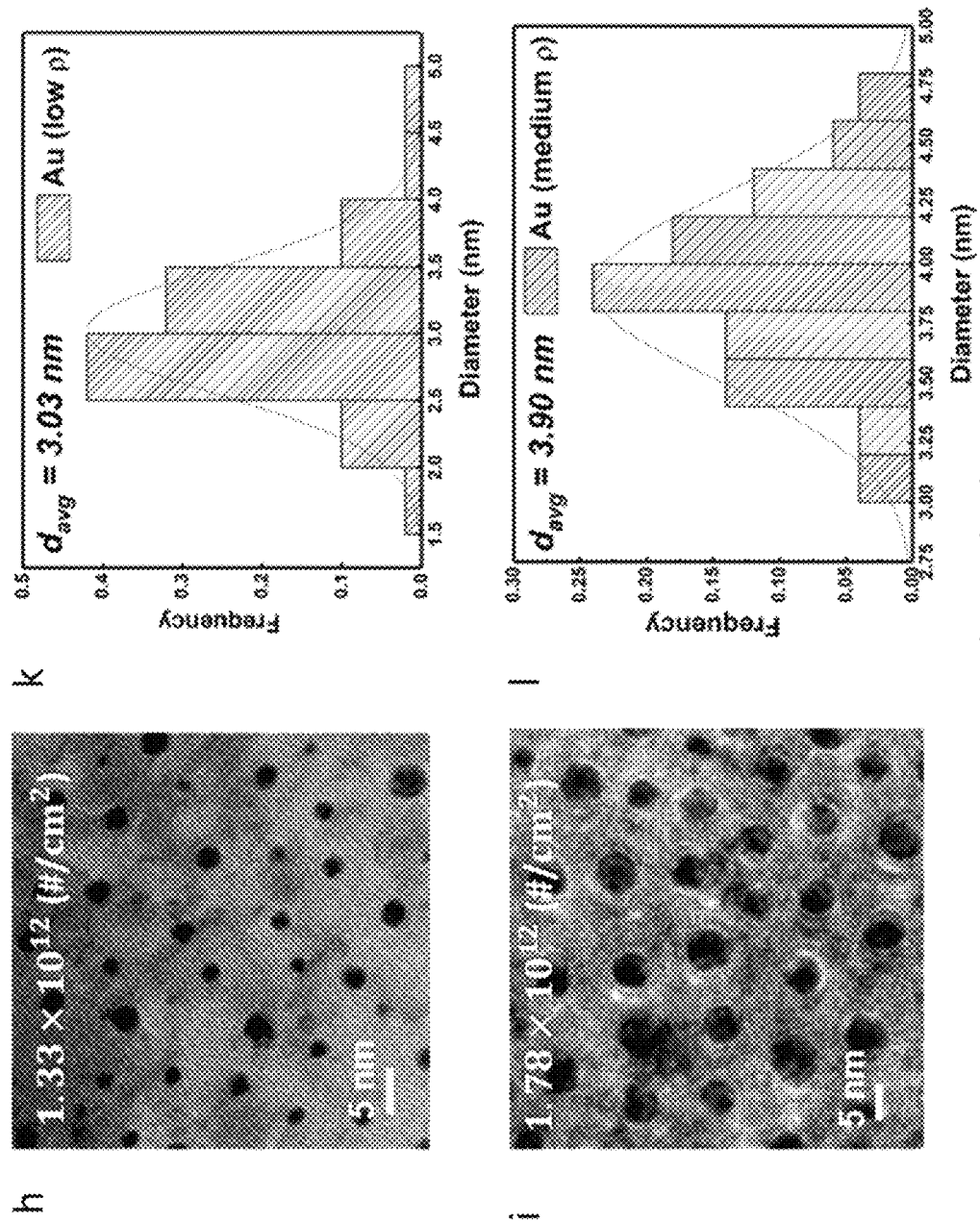
FIGS. 1h-1j are plan-view TEM images and their calculated density expressed by number of nanopillars per centimeter square (#/cm2).
FIGS. 1k-1m are bar graphs of frequency vs. diameter in nm for the pillars presenting Au diameter quantified from the corresponding TEM plan view images, which indicate nanopillar becoming larger in diameter as Au density increases.
Figure 1J:
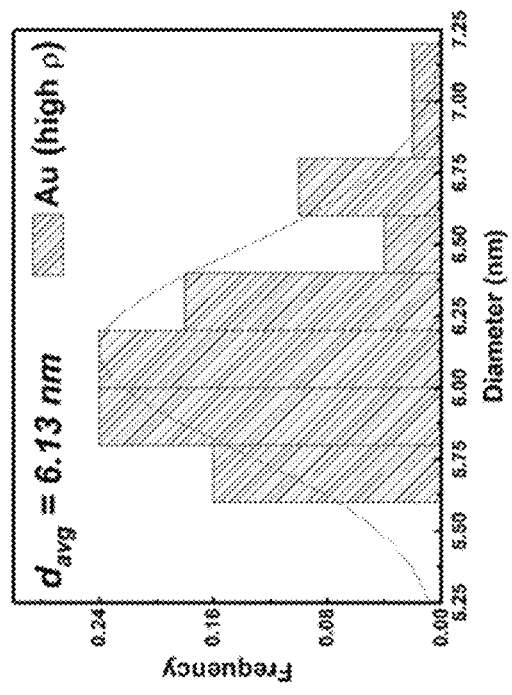
Figure 1M:
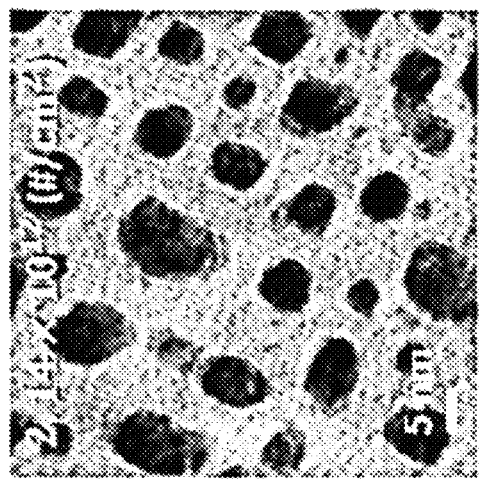
Figures 2A, 2B, 2C, 2D:
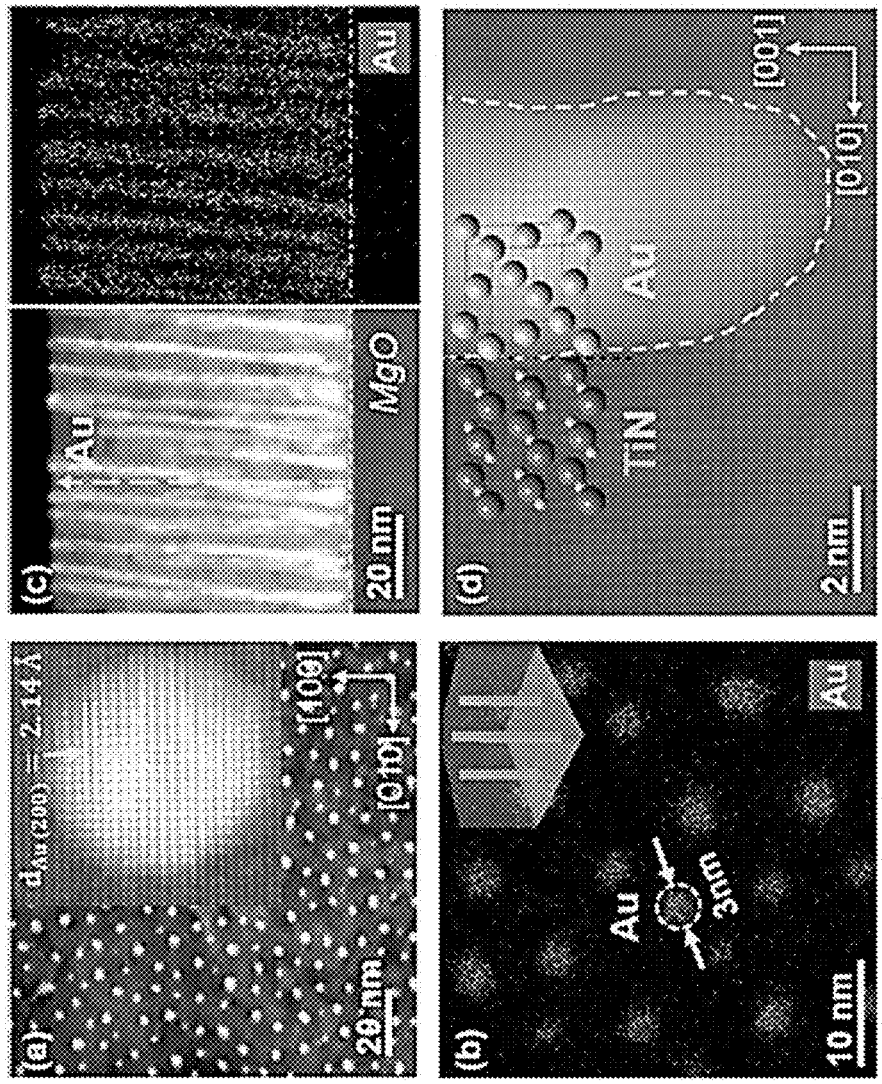
FIG. 2a is a plan view STEM image with high resolution of Au nanopillar top projection (inset image).
FIG. 2b, is a plan view energy dispersive X-ray spectroscopy (EDS) mapping of Au nanopillars, where Au is mapped as dotted clusters, inset is the illustration of low density Au—TiN hybrid platform.
FIG. 2c is a cross-sectional STEM and EDS mapping of an example nanocomposite of the present disclosure.
FIG. 2d is a cross-section high-resolution scanning transmission electron microscopy (HRSTEM) image showing the Au—TiN interface, and its atomic model.
Figure 2F:
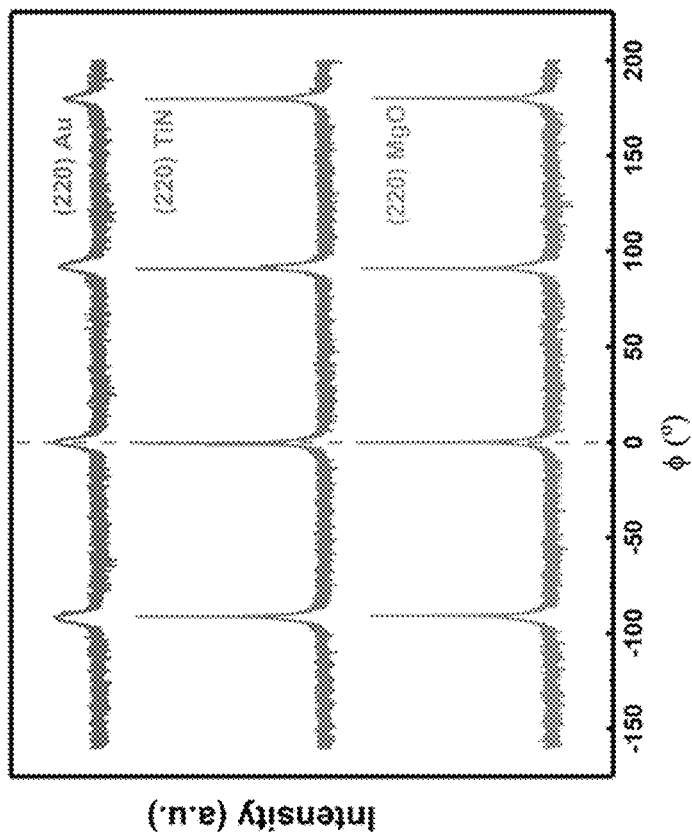
FIG. 2f provides a plot of intensity vs. φ depicting a phi scan of Au-TIN on MgO substrate, indicating a four-fold symmetry without in-plane rotations) from Au, TiN and MgO (220) planes

As evidenced from the plan-view images (FIGS. 1a-1c), the nanopillar dimension and pillar spacing interplays with each other, and the overall volume fraction of the Au nanopillars maintains a gradual increase with the increase of Au density, a detailed quantification is summarized in FIGS. 1h-1m. In particular, FIGS. 1h, 1i, and 1j show plan-view TEM images and their calculated density expressed by number of nanopillars per centimeter square (#/$cm^2$), while FIGS. 1k, 1l, and 1m show bar graphs of frequency vs. diameter in nm for the pillars presenting Au diameter quantified from the corresponding TEM plan view images, which indicate nanopillar becoming larger in diameter as Au density increases. In particular, according to FIG. 1k, a low density Au results in an average pillar diameter of about 3.03 nm, with medium density the average diameter increases to 3.90 nm, and with high density the diameter increases to 6.13 nm. In the experiments performed, low Au density is about $1.33 \times 10^{12}/cm^2$, medium Au density is about $1.78 \times 10^{12}/cm^2$, and high Au density is about $2.14 \times 10^{12}/cm^2$. In general, the diameter can be controlled within 10 nm, and the overall volume fractions of nanopillar densities are gradually tuned. To verify phase distribution and lattice matching of the hybrid thin film, an Au—TiN sample with a lower Au density has been selected for a detailed scanning-TEM (STEM) study and the results are shown in FIGS. 2a-2d. Referring to FIG. 2a, a plan view STEM image is provided with high resolution of Au nanopillar top projection (inset image). Referring to FIG. 2b, a plan view energy dispersive X-ray spectroscopy (EDS) mapping of Au nanopillars is provided, where Au is mapped as dotted clusters, inset is the illustration of low density Au—TiN hybrid platform. Referring to FIG. 2c, a cross-sectional STEM and EDS mapping are provided. Referring to FIG. 2d, a cross-section HRSTEM is provided showing the Au—TiN interface, and its atomic model. The STEM images taken under the high-angle annular dark-field (HAADF) mode from both plan-view (see FIG. 2a) and the cross-section (see FIG. 2c) reveal a very clear contrast between the Au nanopillars and the TiN matrix, where the contrast is proportional to the atomic number ($Z^2$), i.e., the Au nanopillars show a much brighter contrast than that of TiN because of the high Z. The STEM imaging contrast is proportional to the $Z^2$ and thus TiN is darker in contrast while Au has a higher Z number and is brighter in contrast. In addition, the Au nanopillars grow all the way to the top film surface with very sharp interface and very straight pillar structure. The straightness of the nanopillars is related to the following factors: epitaxial quality of the matrix and the pillars, the growth kinetics (e.g. growth rate, deposition energy, temperature) and substrate strain confinement. The average pillar diameter for the selected sample is 3 nm. It should be appreciated that nanopillars are described here are distinguish from nanorods. A nanopillar is thin and long, and with flexible aspect ratio. Conversely, a nanorod is short and wide with small aspect ratio (length/diameter). The aspect ratio can be controlled ranging from 1:1 for a 3 nm thick nanocomposite film to 200:1 for a 1 μm thick nanocomposite film. More interestingly, the distribution of the nanopillars follows a certain degree of ordering in-plane (a hexagonal-close-packed-like arrangement), with an average inter-pillar spacing of 10 nm for this hexagonal arrangement case. Such arrangement of the Au nanopillars could be preferred for well-distributed pillar spacing and density, as well as to balance the in-plane-strain between the Au and TiN phases on the underlying substrate. As evidenced from FIG. 2d, both atomic model (inset) and the HRSTEM image show that the Au/TiN interface transitions are relatively smooth without any misfit dislocations or strain contours, which demonstrates a nearly 1:1 lattice matching between Au and TiN.

Figure 2E:
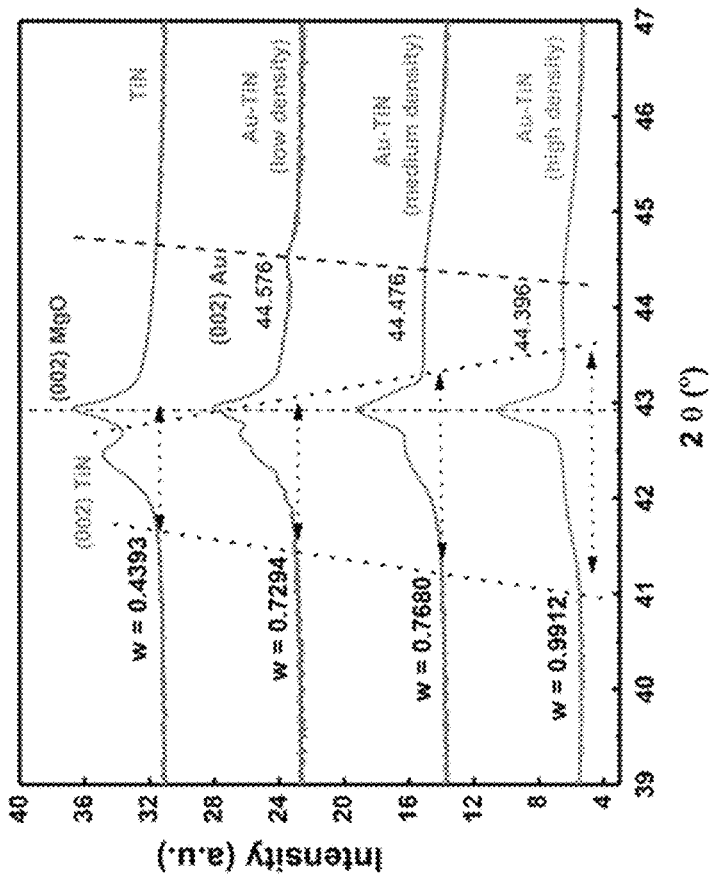
FIG. 2e provides $\theta$-$2\theta$ scans of density tuned Au—TiN nanocomposites versus a pure TIN for reference.

The overall growth orientation and film crystalline quality have been further explored by X-ray diffraction (XRD). FIG. 2e is an intensity plot vs. 2θ which shows the q-2q scans of all the films grown on (001) MgO substrates, and it is clear that both Au and TiN phases are oriented along (001) with a nearly perfect lattice match (<1% strain). Specifically, FIG. 2e shows θ-2θ scans of density tuned Au—TiN nanocomposites versus a pure TiN for reference. Two phenomena are observed by comparing the Au—TiN samples with various Au compositions. First, the full-width at half maximum (FWHM) value of the TiN phase gradually increases with the increase of Au density, meanwhile (002) TiN peak is maintained close to its bulk value (2q (002) TiN ¼ 42.5950). On the other hand, as the Au nanopillar density increases, the (002) Au peak shifts left, approaching its bulk value of 44.3630. These observations suggest a strong vertical strain coupling between TiN and Au for the lower Au density cases. The f scans (shown in FIG. 2f, which is a plot of intensity vs. φ depicting a phi scan of Au-TIN on MgO substrate, indicating a four-fold symmetry without in-plane rotations) from Au, TiN and MgO (220) planes suggest an obvious cube-on-cube relationship without any in-plane lattice rotation, which is consistent with the SAED patterns in insets of FIGS. 1d-1f. Such epitaxial nanocomposite thin film growth is also realized on c-cut sapphire substrates, as confirmed by the XRD results shown in FIGS. 2e-2h with films dominated in (111) orientations. A general widening of (002) TiN peak and continuous increase of (002) d-spacing is observed with increase of Au density. FIG. 2g which is an intensity vs. 2θ, shows a 0-2° scans of the samples grown on (0001) sapphire substrates, with films oriented as (111) for better lattice match. FIG. 2h, which is a plot of intensity vs. ¢ shows a phi scan of films grown on sapphire, indicating a hexagonal (six-fold) symmetry of (111) Au and (111) Ti.

Figures 3A, 3B:
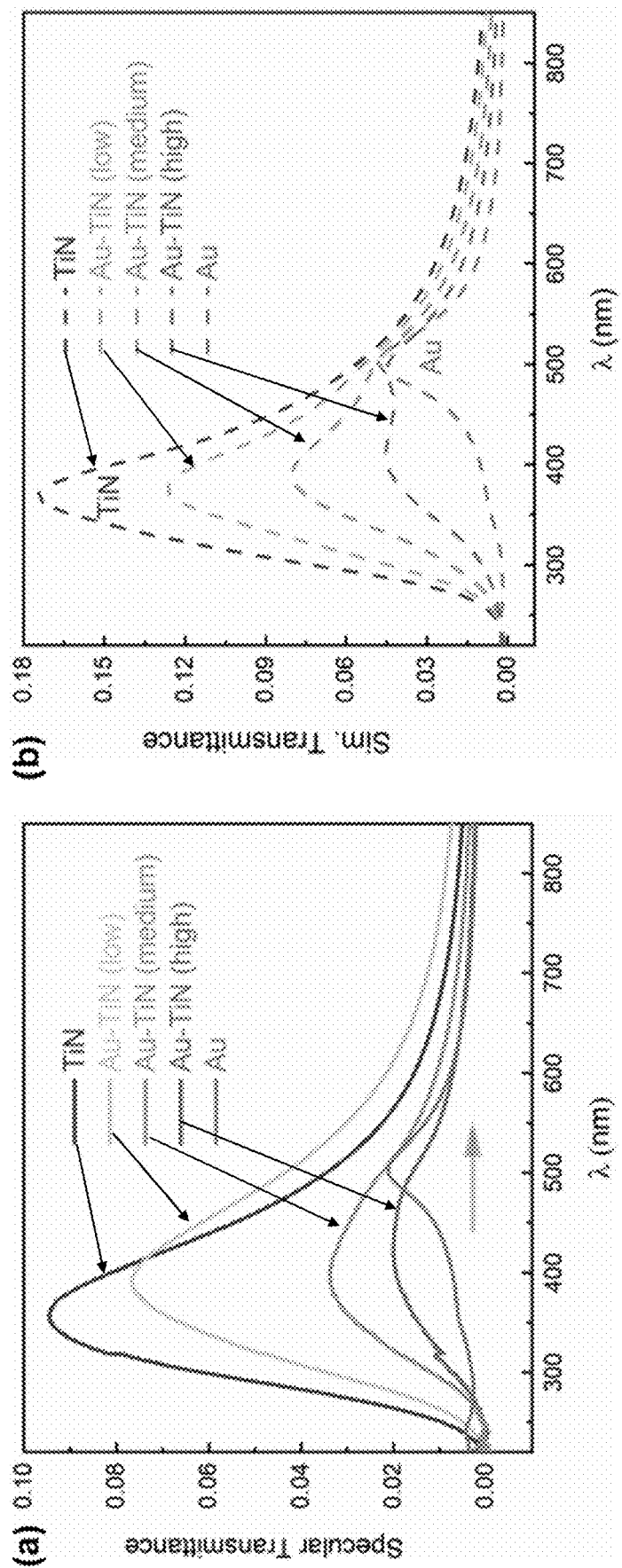
FIGS. 3a and 3b are complex graphs of several plots of spectral transmittance vs. wavelength in nm, showing actual and simulated specular transmittance of pure TIN, and three Au—TiN samples with increasing Au densities, respectively.
Figures 3C, 3D:
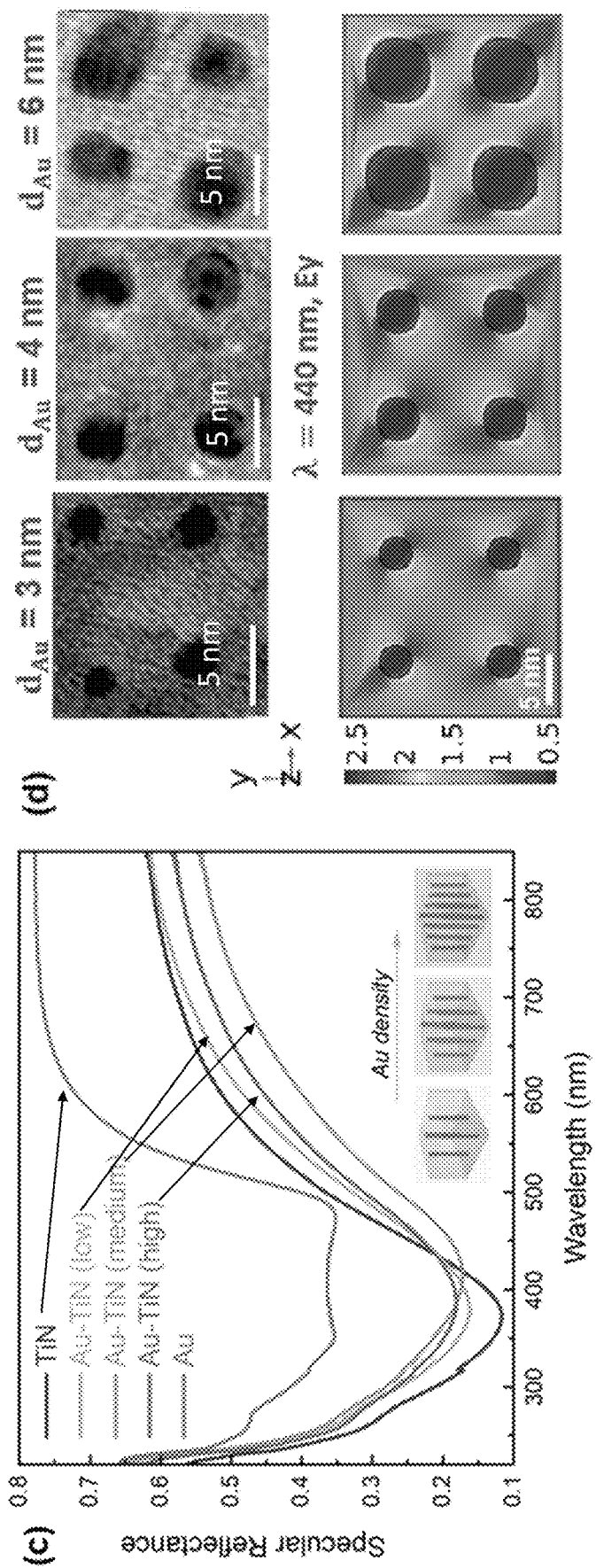
FIG. 3c is the specular reflectance vs. wavelength in nm for five samples using the depolarized light as the source and incident at 8° for the measurement.
FIG. 3d provides plan view TEM images and simulated electric field map at 440 nm of hybrid plasmonic metasurface, respectively, with three different Au densities, where d is the diameter of Au nanopillar.
Figure 3F:
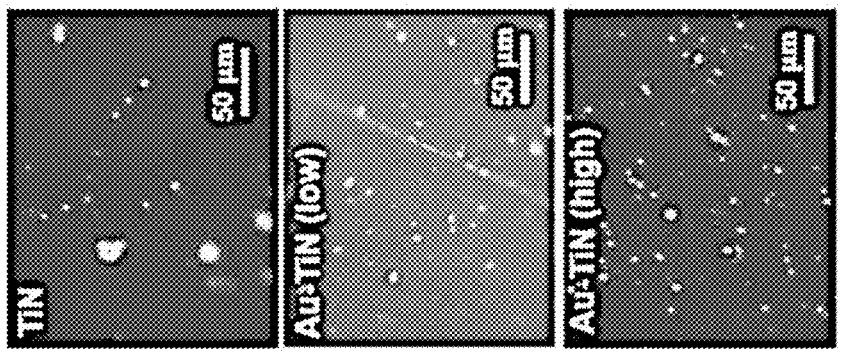
FIG. 3f provides dark-field optical imaging of three thin film samples: pure TIN, low density Au-TIN and high density Au—TiN.
Figure 3E:
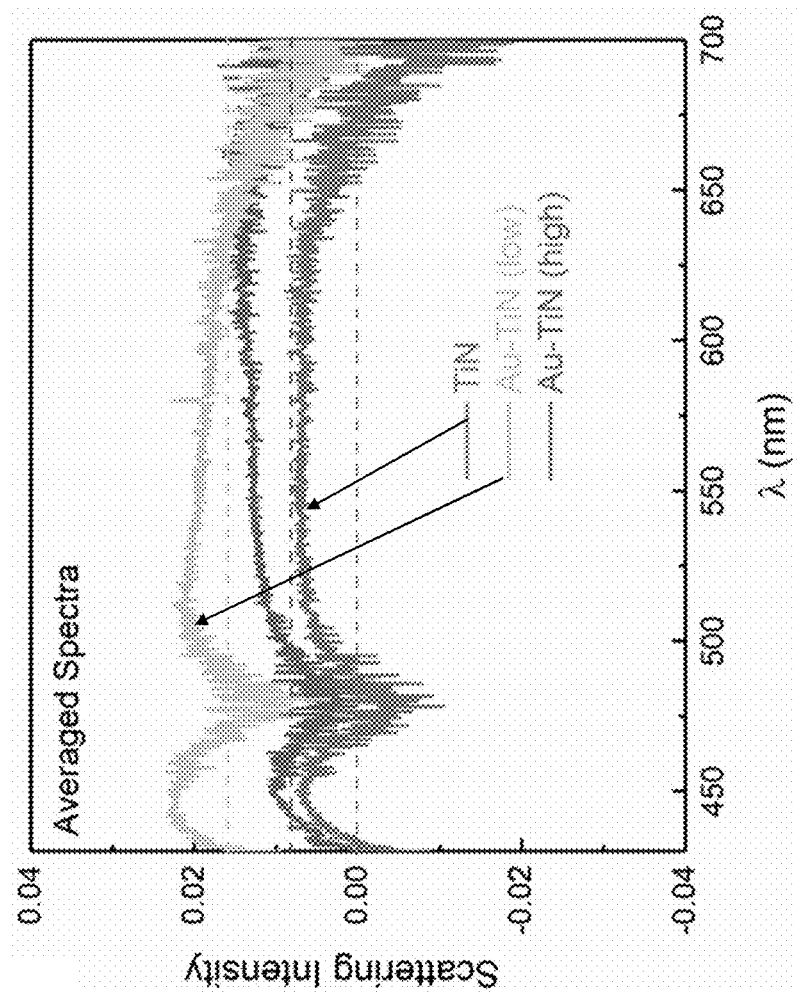
FIG. 3e provides surface scattering intensity of three samples vs. wavelength in nm.

To explore the tunable optical properties of these Au—TiN hybrid thin films with different Au nanopillar densities, normal incidence specular transmittance and reflectance spectra were collected in the wavelength range from 200 to 850 nm. An optical model was built using the COMSOL Wave Optics software package to retrieve the spectral responses and electric field maps for Au—TiN nanocomposite films with varied Au densities; and, to compare with the reference samples (pure TIN and pure Au films). Typical plasmonic resonances for pure TIN and Au are located at 375 nm and 500 nm, respectively. By adding Au nanopillars into the TIN matrix, the resonance peak of the nanocomposite exhibits a red shift gradually as the Au nanopillar density increases. Referring to FIGS. 3a and 3b, measured and simulated transmittance spectra are provided, respectively. FIGS. 3a (and 3b for simulated) is a complex graph of several plots of spectral transmittance vs. wavelength in nm, showing specular transmittance of pure TIN, and three Au—TiN samples with increasing Au densities. The peak separation is less obvious and the intensity drops due to defects in the Au—TiN nanocomposites. Based on the transmittance data results, the peak positions are not very different for different samples. The intensity of the nanocomposites is lower due to the defects introduced in the nanocomposites. Depolarized reflectance spectra with 8° incidence are displayed in FIG. 3c. FIG. 3c is the specular reflectance vs. wavelength in nm for five samples using the depolarized light as the source and incident at 8° for the measurement. Similarly, the resonance experiences a red shift (i.e., the peak shifts to higher wavelength range) and the reflectance spectrum experiences an intensity reduction (above a wavelength of about 450 nm) as the Au nanopillar density increases, which suggests a stronger absorptance for Au—TiN hybrid nanostructure as compared to the pure TiN. Surface scattering spectra and back scattering images of pure TIN and Au-TIN samples are coupled in FIGS. 3e and 3f which indicate the metasurfaces are highly smooth, and appreciable specular reflectance in the visible to infrared regime is further proved. In particular, FIG. 3e shows surface scattering intensity of three samples vs. wavelength in nm. The scattering intensity of the three samples are too low to contribute significantly to the reflectance signals, indicating high specular reflectance from the smooth metasurfaces. FIG. 3f shows dark-field optical imaging of three thin film samples: pure TiN, low density Au-TIN and high density Au—TiN. The bright spots are attributed to micron-scale surface defects or agglomerations. Based on the optical measurements, the wavelength of 440 nm is selected to map the electric field (along y direction) distributions of metasurface with three different Au pillar densities (see FIG. 3d, which provides plan view TEM images and simulated electric field map at 440 nm of hybrid plasmonic metasurface, respectively, with three different Au densities, where d is the diameter of Au nanopillar). The simulation has been performed with comparable dimensions to the real structure as seen from plan view TEM images (the upper pane). It is noted that the increase of the Au volume fraction causes enhanced near field interactions at metasurface and the Au/TIN interfaces.

Figures 4A, 4B:
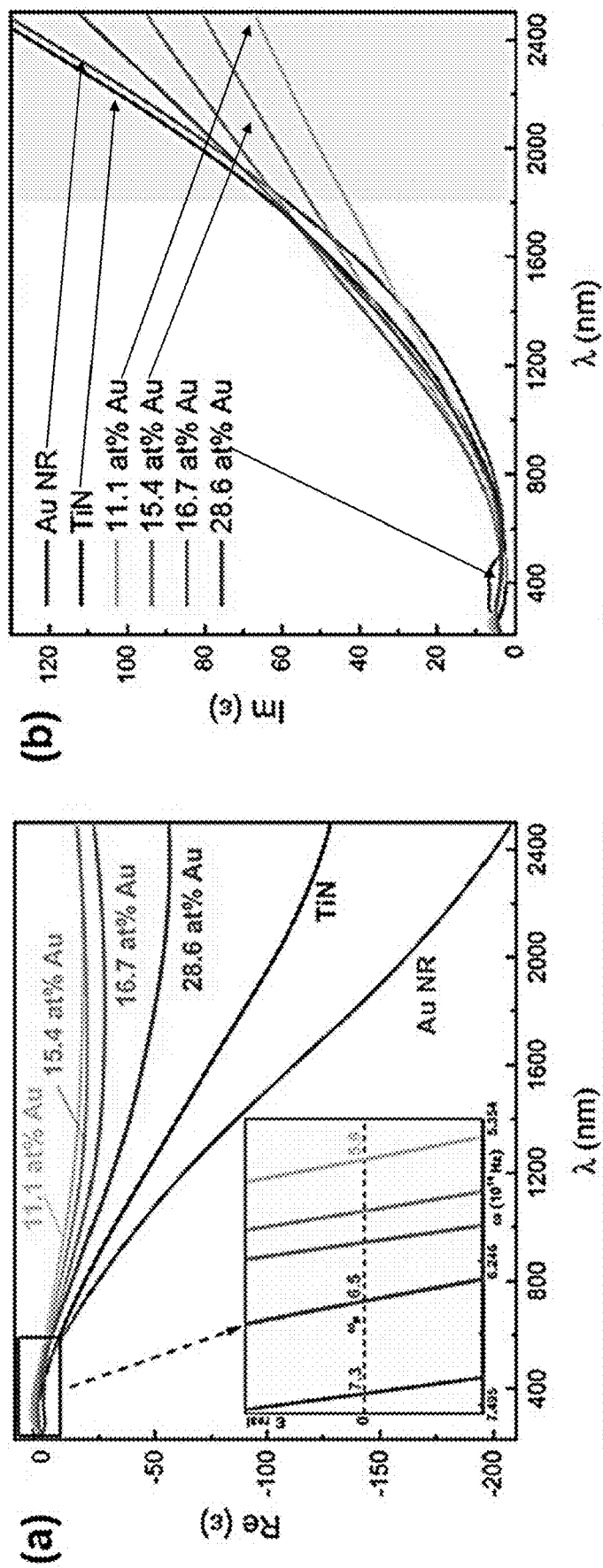
FIGS. 4a-4d are representations of optical constants and charge carrier density profile, in particular, real and imaginary parts of permittivity of the listed samples: Au (r=3 nm) nanorods (calculated), pure TIN, Au-TIN films with different Au densities (11.1 at %, 15.4 at %, 16.7 at % and 28.6 at %) vs. wavelength are shown in FIGS. 4a and 4b, respectively.
Figure 4C:
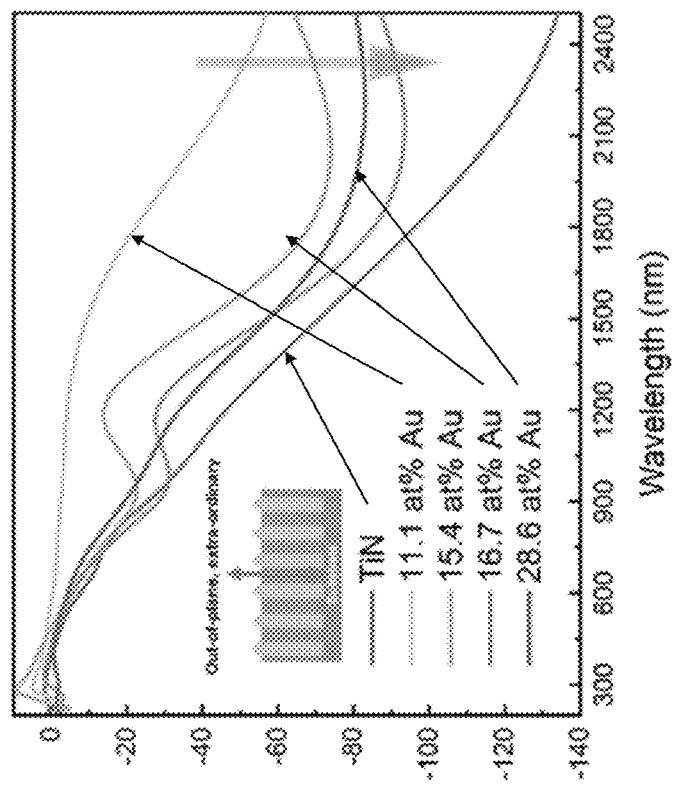
Figure 4D:
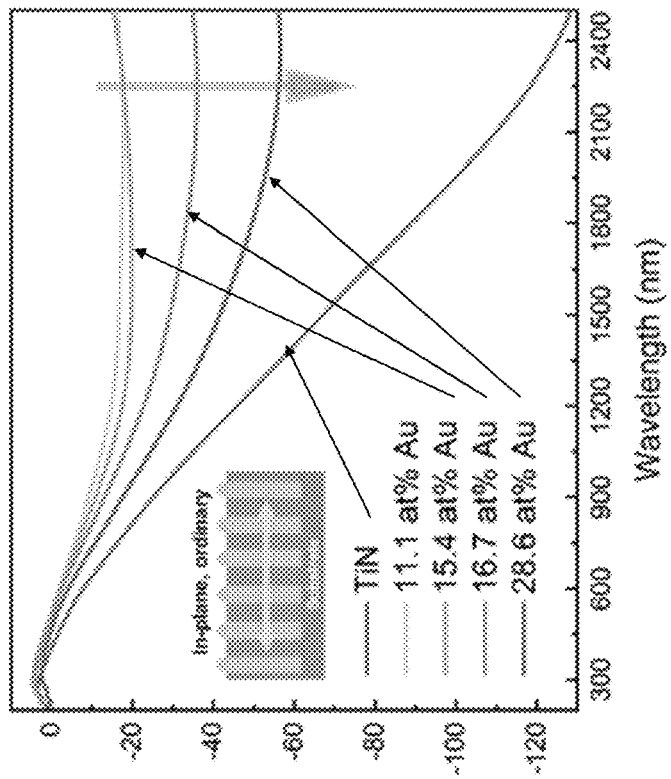
Figure 4E:
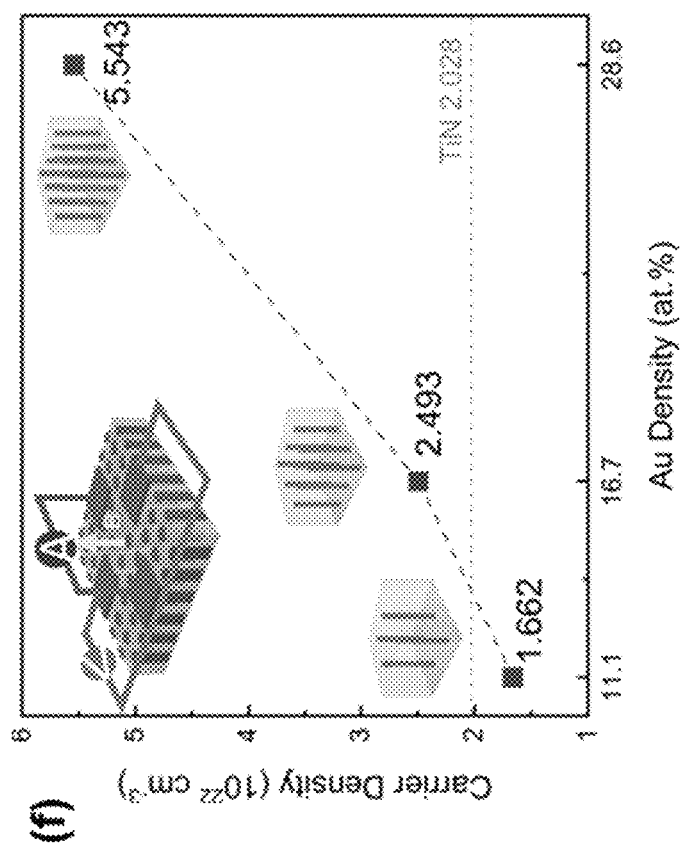
FIG. 4e is a plot of Plasma frequency as a function of three Au densities: 11.1 at %, 16.7 at % and 28.6 at %.
Figure 4F:
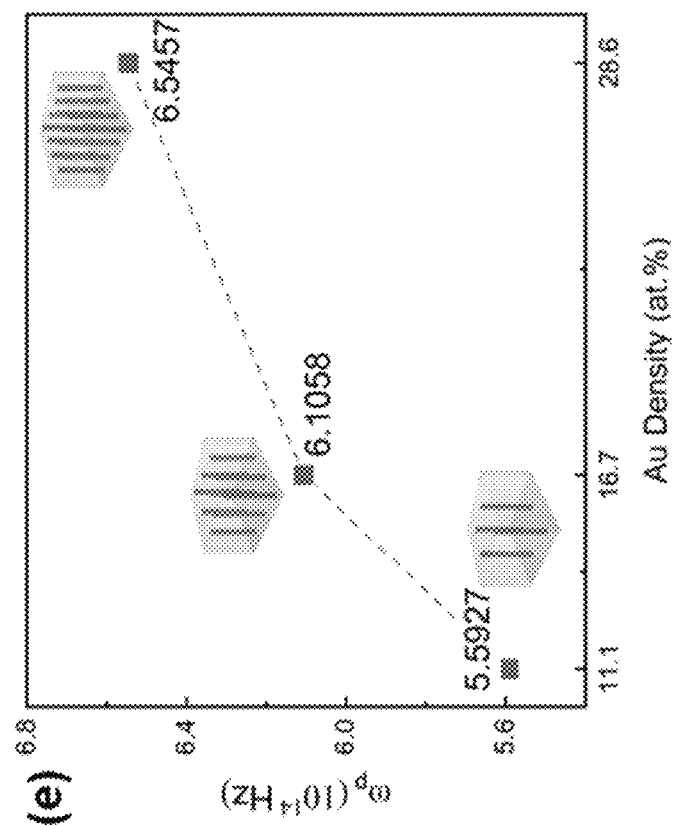
FIG. 4f is a plot of carrier densities from Hall measurements as a function of Au densities: 11.1 at %, 16.7 at % and 28.6 at %.
Figure 4H:
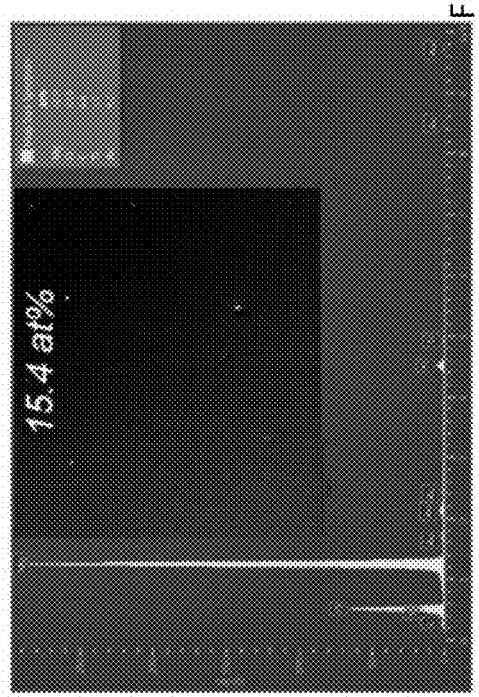
FIGS. 4g-4j are EDS mapping of critical elements from a large scale for atomic percentage quantification of Au nanopillars in the TiN matrix.
Figure 4J:
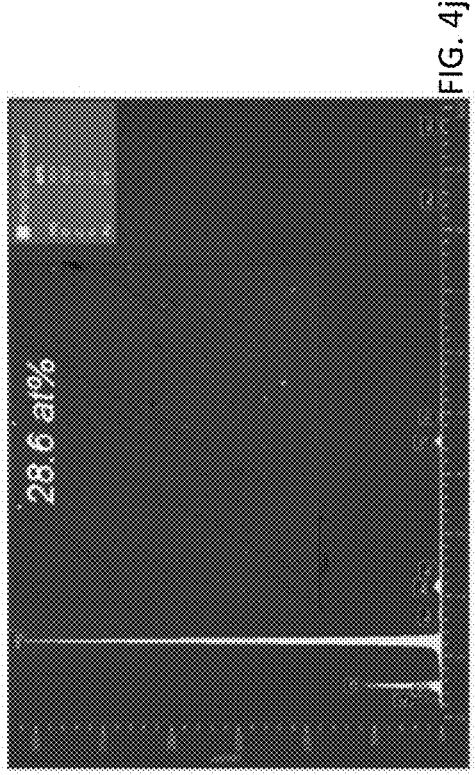
Figure 4G:
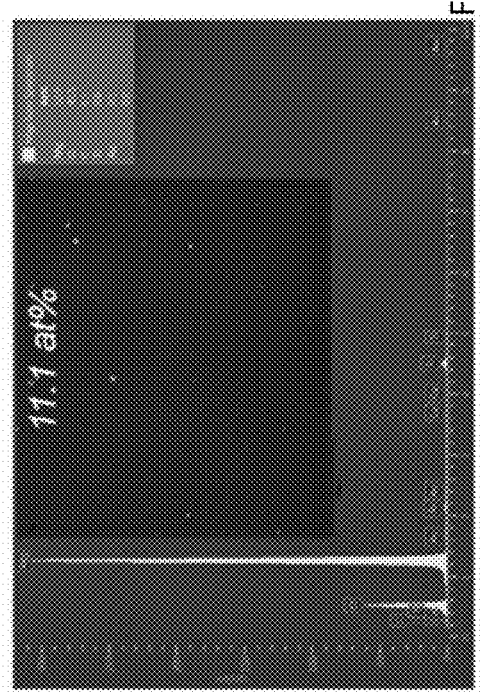
Figure 4I:
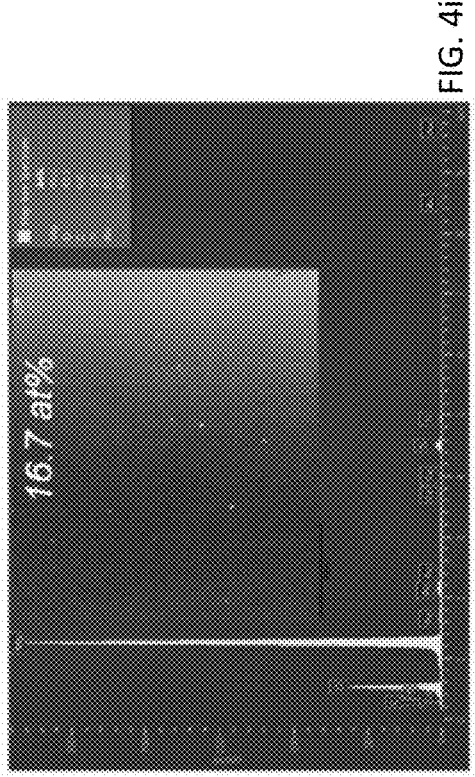

The tunable optical parameters as a function of Au nanopillar density were explored by detailed ellipsometry analysis on the films with various Au densities: 11.1 at %, 15.4 at %, 16.7 at % and 28.6 at %, which are confirmed by the EDX composition analysis (as shown in FIGS. 4g-4j, which are EDS mapping of critical elements from a large scale for atomic percentage quantification of Au nanopillars in the TiN matrix), while the film thickness and nanopillar diameter (6 nm) are comparable. In particular, EDS mapping of critical elements from a large scale for atomic percentage quantification of Au nanopillars in the TiN matrix are shown in FIGS. 4g-4h. Atomic percentage of elements (Mg, O, C, Ti, Au) are shown at top corner. Insets are SEM images which confirm smooth surfaces of the Au—TiN/MgO samples, with quantified Au densities: FIG. 4g: 11.1 at %, FIG. 4h: 15.4 at %, FIG. 4i: 16.7 at %, and FIG. 4j: 28.6 at %. Au density calculation is carried using:

$$\rho_{Au\ at\ \%} = \frac{Au\ at\ \%}{Au\ at\ \% + Ti\ at\ \%}.$$

Figure 4L:
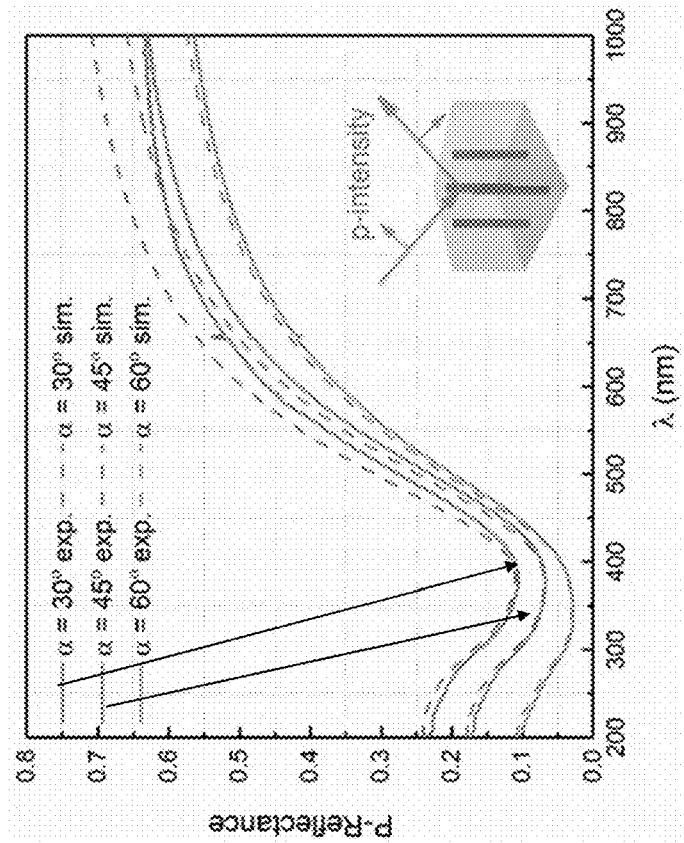
FIGS. 4k-4n provide angular dependent reflectance intensities for both s- and p-polarized light excitations of low density Au-TiN (as shown in FIGS. 4k-4l which are S- and P-reflectance vs. wavelength, respectively, for different actual and simulated incident angles), and high-density Au-TIN (shown in FIGS. 4m-4n, which are again S- and P-reflectance vs. wavelength, respectively, for different actual and simulated angles).
Figure 4K:
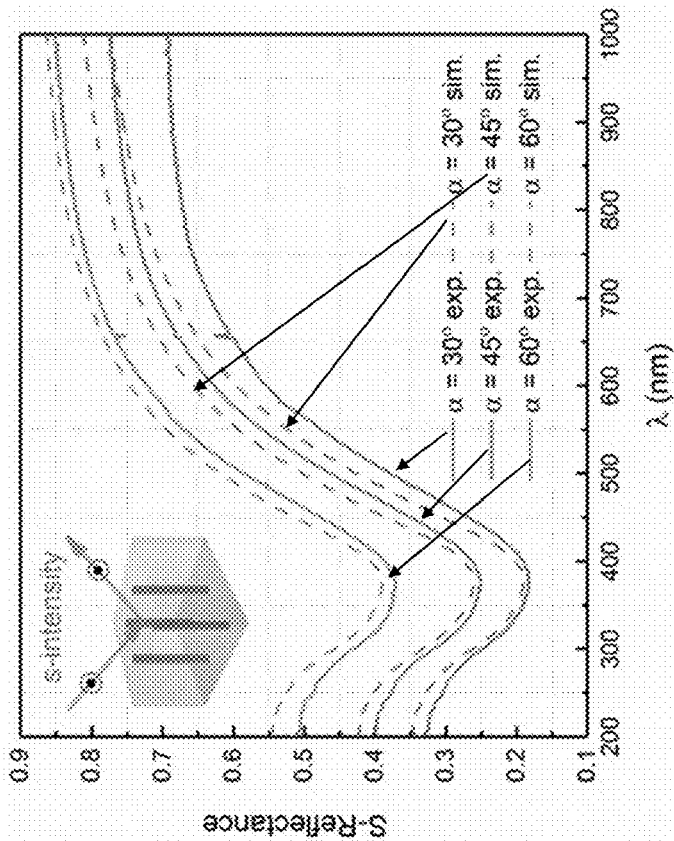
Figure 4P:
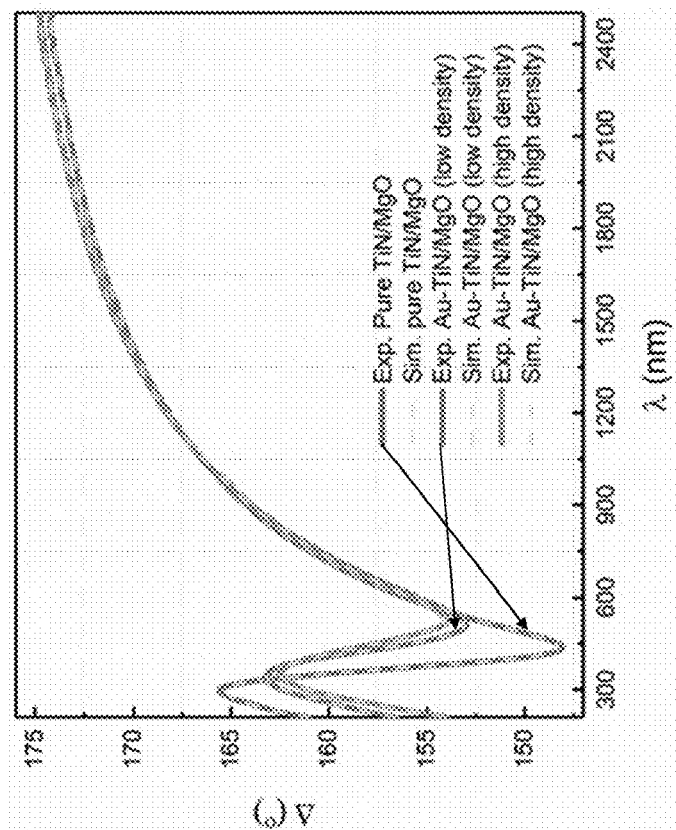
FIGS. 4o-4p provide psi (FIG. 4o) and delta ellipsometric (FIG. 4p) and fitted parameters of pure TIN and Au—TiN nanocomposites based on different Au densities.
Figure 4O:
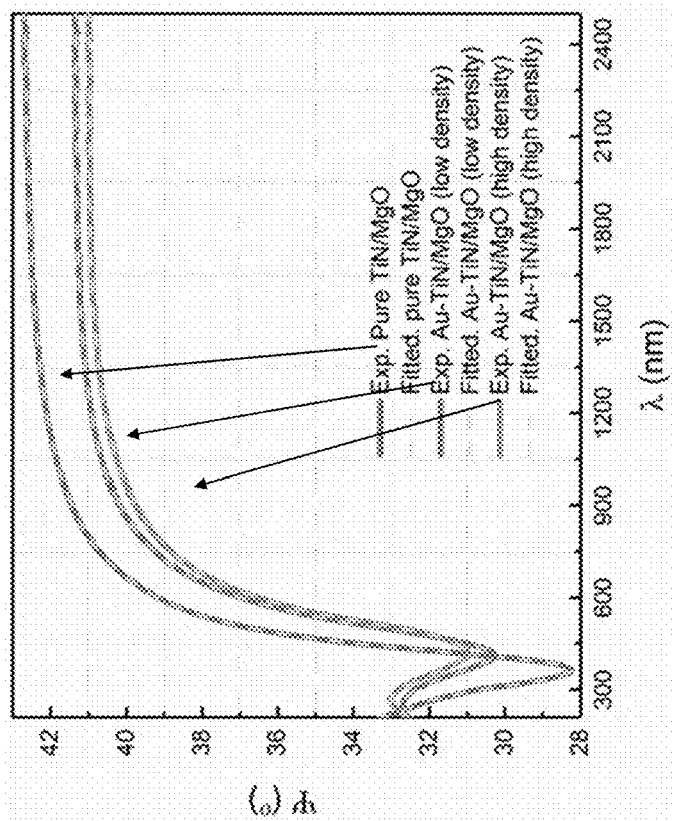
Figure 4R:
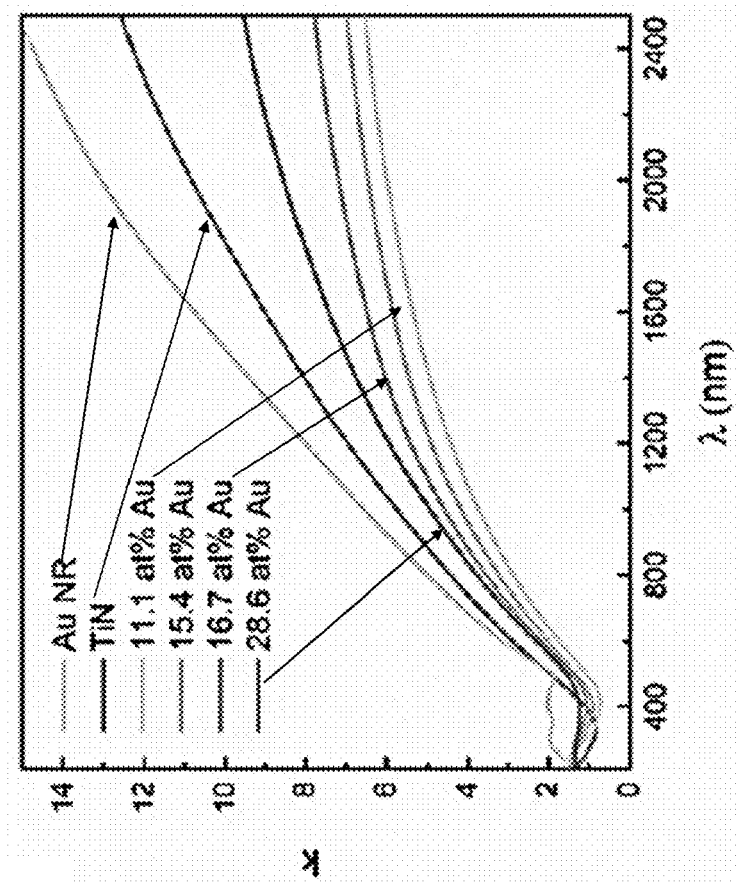
FIG. 4q provides refractive index vs. wavelength and FIG. 4r provides extinction coefficient vs. wavelength of Au nanorods (calculated).
FIG. 4s is an in plane (ordinary) real part dielectric constant of an example nanocomposite of the present disclosure.
FIG. 4t is an out-of-plane (extra-ordinary) real part dielectric constant of an example nanocomposite of the present disclosure.
FIG. 4u is an in plane imaginary part dielectric constant of an example nanocomposite of the present disclosure.
FIG. 4v is an example out-of-plane imaginary part dielectric constant of an example nanocomposite of the present disclosure.
FIGS. 4w-4y provide band diagrams for Au-TIN metallic junction of the nanocomposite structures of the present disclosure to illustrate the charge carrier transfer across the Au-TIN interfaces.
FIG. 4z is a schematic of measurement setup for Hall measurements.
Figure 4Q:
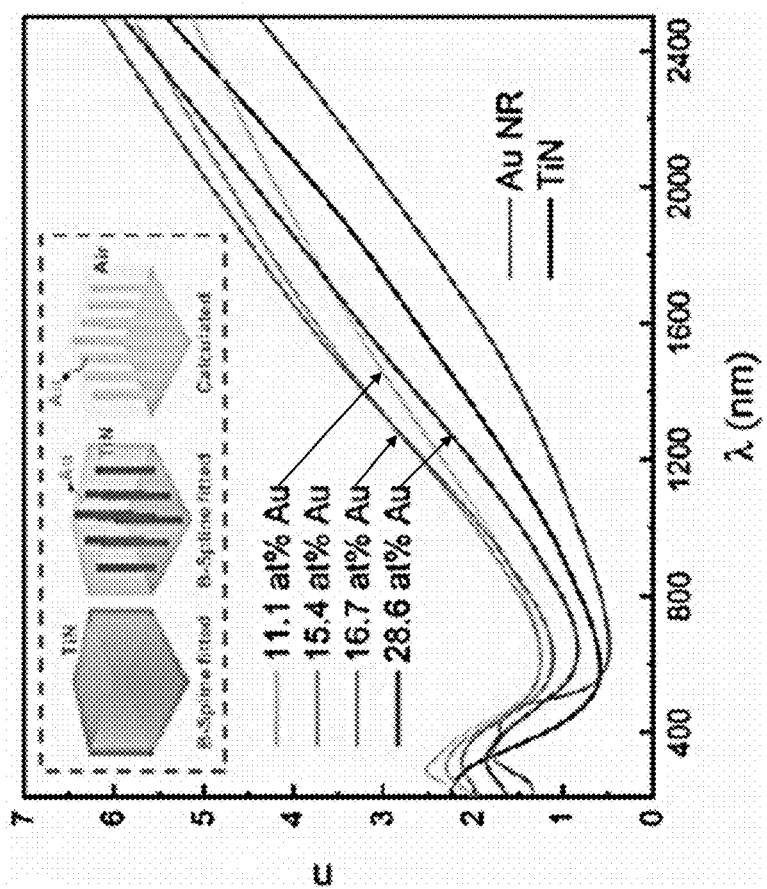

The phase difference (Psi) and amplitude (Delta) in 210 to 2500 nm range with various incident angles were collected on a 200 nm Au film, pure TIN (80 nm) and Au—TiN hybrid films (40 nm) with four different densities. A B-spline model using the commercial CompletEASE software package was applied to retrieve effective parameters of each film and shows a desired match with experimental results (as seen in FIGS. 4O-4p). The polarized light reflectance intensities of two Au—TiN nanocomposites with high and low Au densities are shown in FIGS. 4k-4n. The resonance of the higher density Au—TiN is broadened and red shifted due to the Au addition. Referring to FIGS. 4k-4r, angular dependent reflectance intensities for both s- and p-polarized light excitations of low density Au-TIN (as shown in FIGS. 4k-4l which are S- and P-reflectance vs. wavelength, respectively, for different actual and simulated incident angles), and high-density Au-TIN (shown in FIGS. 4m-4n, which are again S- and P-reflectance vs. wavelength, respectively, for different actual and simulated angles). Three angles including 30, 45, and 60 degrees were selected for measurements. Note that the trend of the s- and p-polarized spectra as a function of the incident angle is opposite. Because s-polarized light vibrates mainly parallel to the surface, the overall reflectance signal increases at more oblique incidence. However, the TM (p-polarized) tensor propagating into the film induces stronger surface plasmon polaritons (SPPs) at metasurface/air interface as well as Au nanopillar/TiN interfaces, therefore showing enhanced reflectance intensity at larger angles of incidence. FIG. 4O shows psi and FIG. 4p shows delta ellipsometric and fitted parameters of pure TIN and Au-TIN nanocomposites based on different Au densities. Optical constants are retrieved using B-Spline models, which specifies optical constants versus wavelength using a series of control points (nodes) which are equally spaced in photon energy (eV), detailed theory is described elsewhere. Averaged mean square error (MSE) in this model is 0.842, indicating a desired match between experimental and fitted data. FIG. 4q shows refractive index vs. wavelength and FIG. 4r shows extinction coefficient vs. wavelength of Au nanorods (calculated), pure TiN film and four Au—TiN films with different Au densities. The extinction coefficient at higher wavelength range indicates lower losses of Au—TiN hybrids as compared to pure Au or TiN films. The extinction coefficient also called k value is an important optical parameter derived from the optical ellipsometry measurement. It is strongly related to the loss of the materials. If the k value is low, the loss is lower. This data show our hybrid films have low extinction coefficient and low loss).

Next, the optical constants were retrieved from the B-Spline model. In addition, the dielectric constant of Au nanopillars from the bulk Au ($3_{bulk}$) film is calculated, $$\varepsilon_{Au} = \varepsilon_{bulk} + \frac{i\omega_p^2(R_b - R)}{\omega(\omega\tau + i)(\omega\tau R + iR_b)} \quad R \le R_b$$

where $\omega_p$ (13.7×10$^{15}$ Hz) is the plasma frequency, $$R\left(R\frac{1}{4}3\ nm\right)$$

is diameter of Au nanopillar,
$R_b$ (35.7 nm) is mean free path, and
s (2.53×10$^{-14}$ s) is the relaxation time for free electrons in bulk Au. The complex dielectric functions ($\varepsilon_1$ and $\varepsilon_2$) are plotted in FIGS. 4a-4d and the corresponding refractive index (n) and extinction coefficient (k) are shown in FIGS. 4q and 4r, respectively.

Referring to FIGS. 4a-4d, a representation of optical constants and charge carrier density profile is provided. In particular, real and imaginary parts of permittivity of the listed samples: Au (r=3 nm) nanorods (calculated), pure TIN, Au-TIN films with different Au densities (11.1 at %, 15.4 at %, 16.7 at % and 28.6 at %) vs. wavelength are shown in FIGS. 4a and 4b, respectively. Similarly, ordinary (in-plane) and extra-ordinary (out-of-plane) real part dielectric constants are shown vs. wavelength in FIGS. 4c and 4d. FIG. 4e is a plot of Plasma frequency as a function of three Au densities: 11.1 at %, 16.7 at % and 28.6 at %; and FIG. 4f is a plot of carrier densities from Hall measurements as a function of Au densities: 11.1 at %, 16.7 at % and 28.6 at %. Pure TIN (dashed line) carrier density is shown as reference, and the inset is the illustration of Hall experiment setup.

Figure 4T:
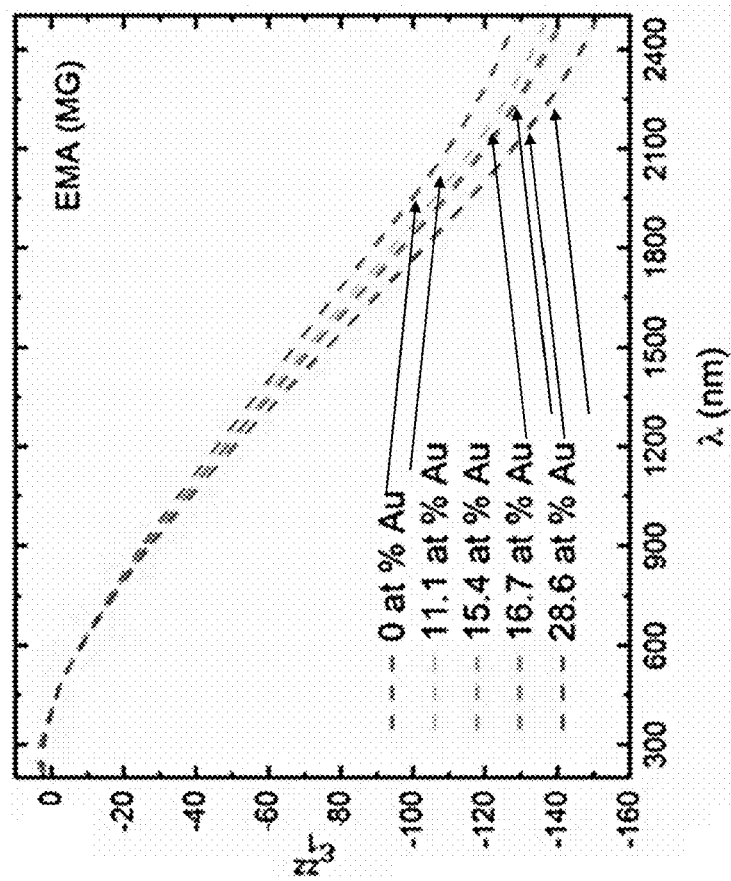
Figure 4S:
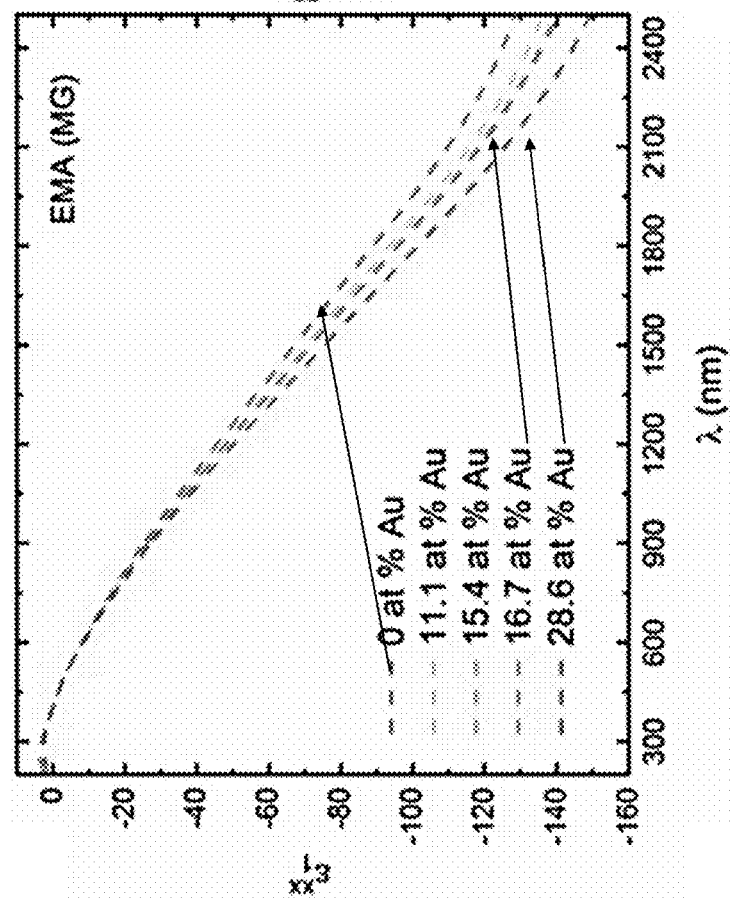
Figure 4V:
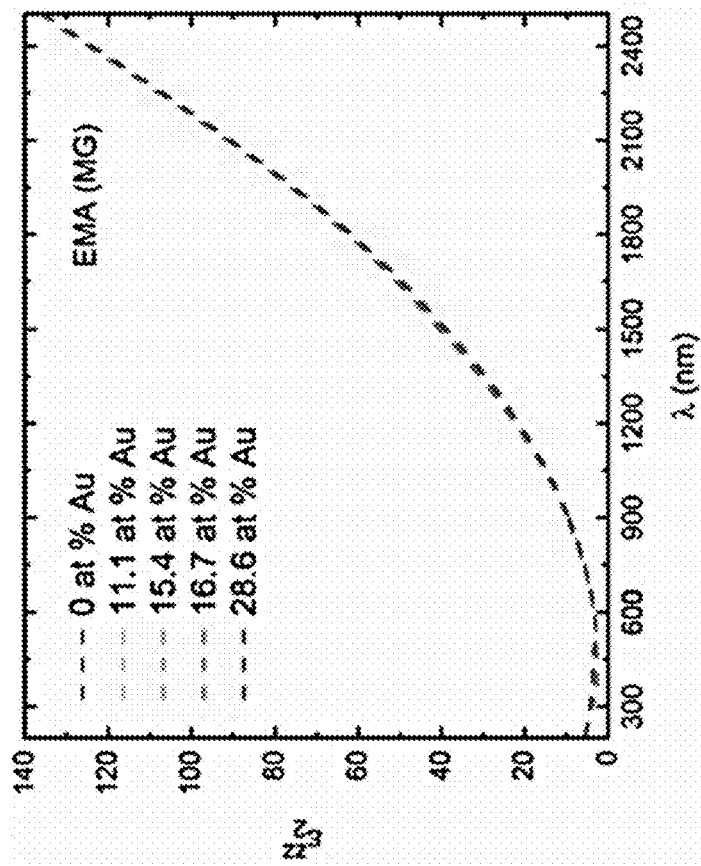
Figure 4U:
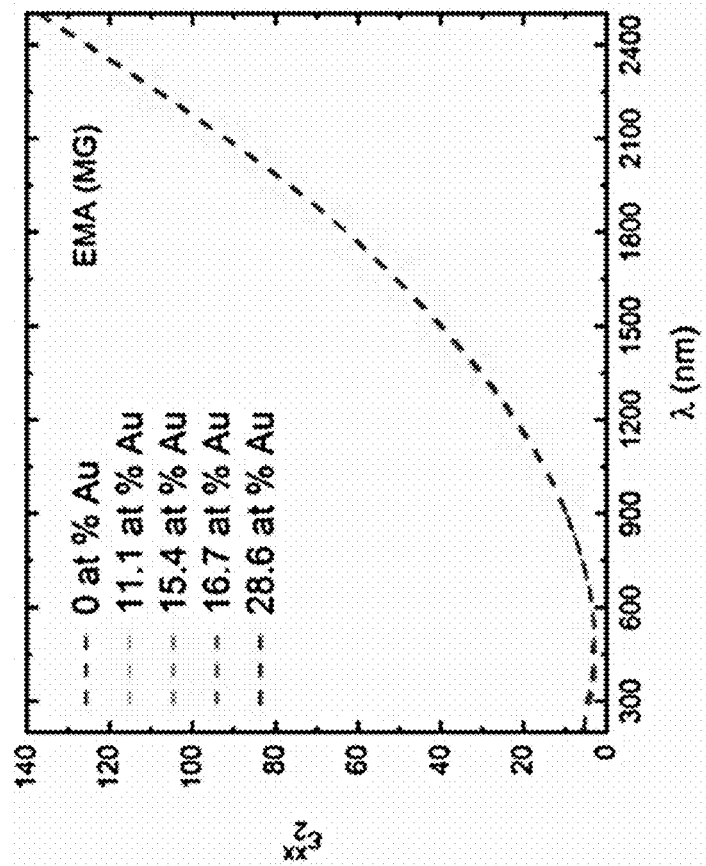

Consider the Au—TiN hybrid films as homogeneous layer (FIGS. 4a and 4b), the overall dielectric constant as a function of Au density is gradually tuned towards more negative, which means higher Au density contributes to stronger plasmonic response but meanwhile maintains lower losses (smaller k) as compared to pure Au or TiN. Such tuning is more pronounced at higher wavelength range. Interestingly, when the dielectric constants are fitted using the anisotropic model (see FIGS. 4c and 4d), the separation between in-plane (ordinary) and out-of-plane (extra-ordinary) responses is clear as compared to pure TiN film (isotropic). Results indicate strong optical anisotropy in Au—TiN hybrid films. Note that the overall trend of in-plane and out-of-plane dielectric constants follow the trends of the isotropic model, i.e., the dielectric constant decreases as the Au density increases. The oscillations of extra-ordinary terms (see FIG. 4d) can be correlated to vertical strain coupling effect. As a comparison, the anisotropic dielectric constants using effective medium theory (the Maxwell-Garnett (MG) method, known to a person having ordinary skill in the art) are calculated and shown in FIGS. 4s-4v. In particular, anisotropic effective permittivity as a function of Au densities in Au—TiN hybrid thin films are shown in FIGS. 4s-4v. FIG. 4s shows in plane (ordinary) real part dielectric constant, FIG. 4t shows out-of-plane (extraordinary) real part dielectric constant, FIG. 4u shows in plane imaginary part dielectric constant, and FIG. 4v shows out-of-plane imaginary part dielectric constant. Results are calculated from effective medium theory Maxwell-Garnett (MG) method:

$$\varepsilon_{xx,yy} = \frac{A\varepsilon_{Au}\varepsilon_{TiN} + (1-A)\varepsilon_{TiN}[\varepsilon_{Au} - \varepsilon_{TiN}]}{A\varepsilon_{TiN} + (1-A)\left[\varepsilon_{TiN} + \frac{1}{2}(\varepsilon_{Au} - \varepsilon_{TiN})\right]} \text{ and}$$

$$\varepsilon_{zz} = A\varepsilon_{Au} + (1-A)\varepsilon_{TiN},$$

where A is the area fraction of the Au nanopillars, which is calculated according to the atomic percentage of Au quantified from SEM, $\varepsilon_{Au}$ and $\varepsilon_{TiN}$ are wavelength dependent dielectric functions of Au and TiN, respectively, $\varepsilon_{xx}$, $\varepsilon_{yy}$ are in-plane (ordinary) dielectric constants, while $\varepsilon_{zz}$ is the out-of-plane (extraordinary) dielectric constant. The Maxwell-Garnett method is used here due to the dilute and well-separated Au nanopillars, with densities ranging from 11.1 at % to 28.6 at %.

Figure 4X:
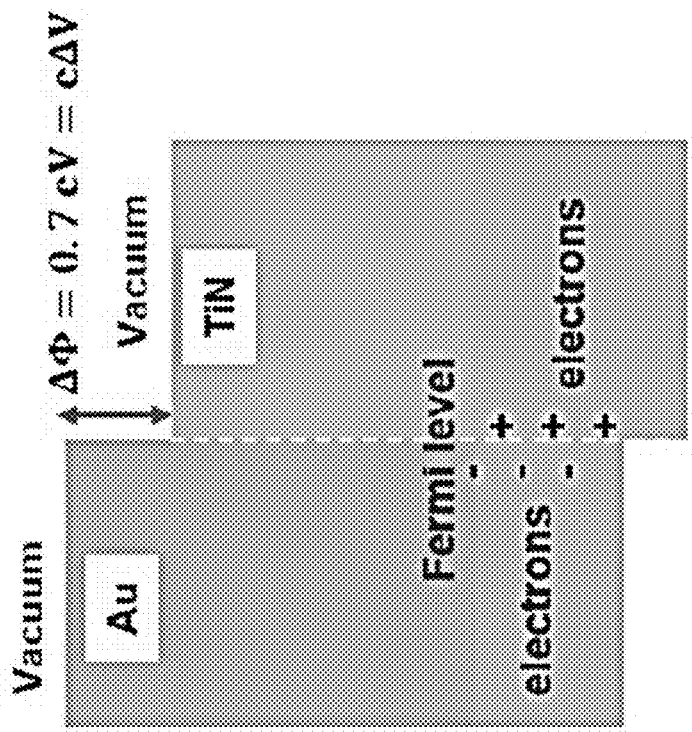
Figure 4W:
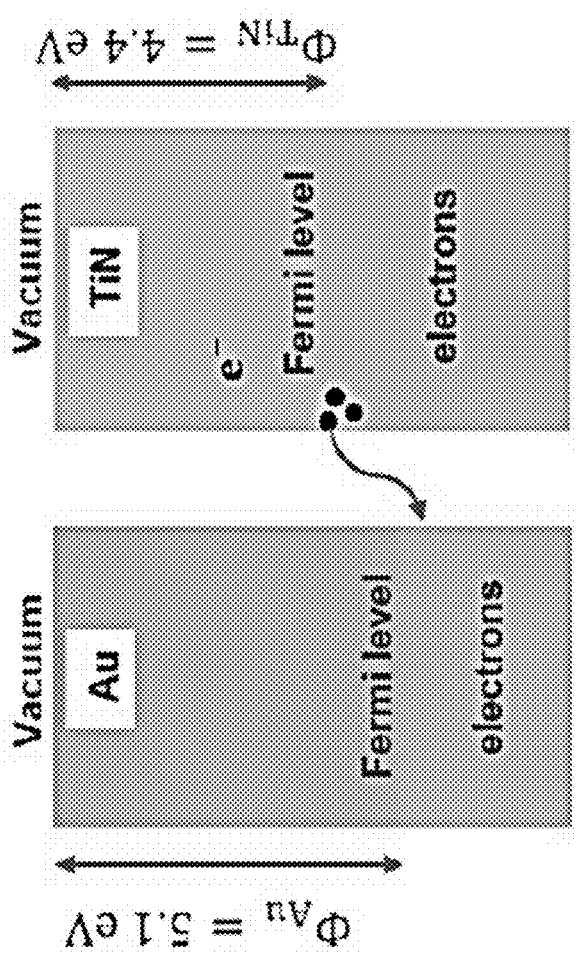
Figures 4Y, 4Z:
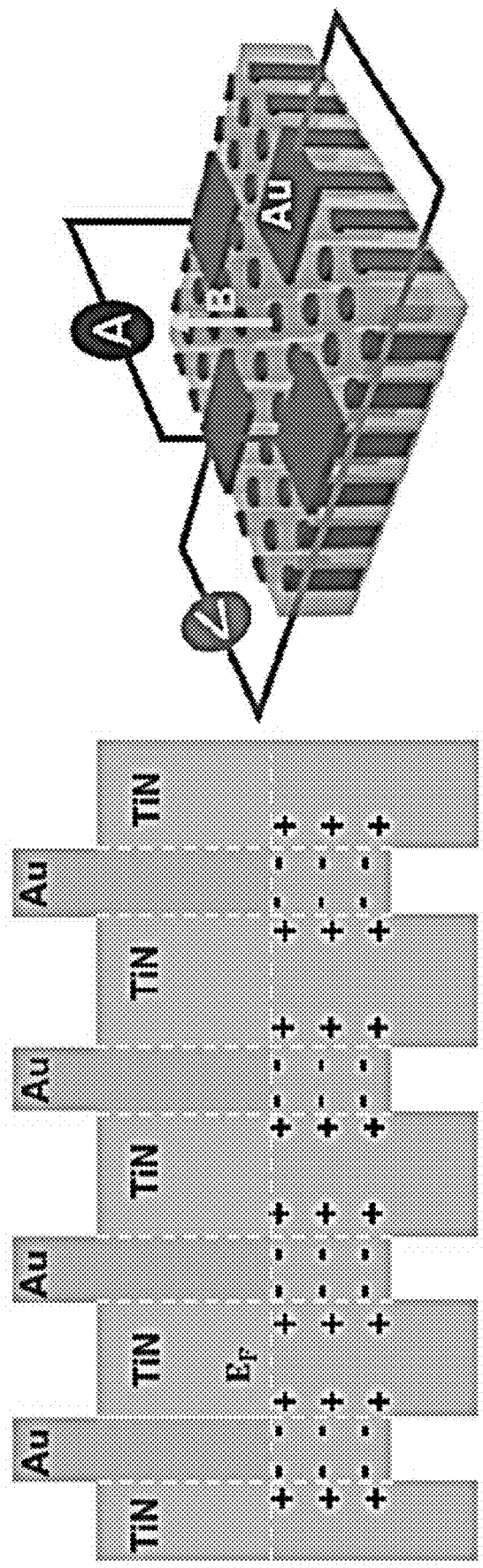

Plasma frequencies retrieved from & are plotted as a function of Au density in FIG. 4e. The shift from $5.6\times10^{14}$ Hz (11.1 at % Au) to $7.0\times10^{14}$ Hz (28.6 at % Au) indicates a potential increase of electron densities introduced by higher volume ratio of Au phase. Therefore, Hall measurements were performed on three Au-TIN nanocomposites with 11.1 at %, 16.7 at % and 28.6 at % Au densities, pure TiN is measured as a reference. The measurement setup with the contact geometry is shown in FIG. 4z, which is a schematic of measurement setup for Hall measurements. The carrier density is calculated using the equation:

$$n_e = \frac{I \cdot B}{V_H \cdot t \cdot e} \text{ (cm}^{-3}\text{)}$$

where $V_H$, I, and B are voltage, current and magnetic field applied, respectively, and
t is film thickness. The resulted charge carrier concentration is plotted in FIG. 4f. It is confirmed that increase of Au nanopillar density would increase its electron density, which induces the left shift of plasma frequency (plotted in parallel), and enhanced plasmonic resonance. The band diagrams for Au—TiN metallic junction of the nanocomposite structures of the present disclosure are shown in FIGS. 4w-4y to illustrate the charge carrier transfer across the Au-TIN interfaces. In particular, the band diagram according to the present disclosure at Au—TiN junction, and the predicted electron density profile at nanocomposite cross-section are shown in FIGS. 4w-4y. Bulk Au and TiN have a work function of 5.1 eV and 4.4 eV, respectively. At the metallic junction (boundaries) between Au and TiN, there could be electron density variances that electrons accumulated at the Au side while holes at the TiN side. Overall, the Au-TIN nanocomposites are showing enhanced charge carrier density with increased Au nanopillar densities. The work functions of bulk Au and TiN are 5.1 eV and 4.4 eV, respectively. To compensate the difference in work function and charge carrier density across the boundary, electrons move from TiN into Au when they are in contact with each other, which results in the electrons accumulated at the Au side while holes at the TiN side. Compared to the reference pure TiN sample, results demonstrate a systematic enhancement on electron density as a function of Au density. Nevertheless, other factors such as electron trapping at the nanopillar interface can also contribute to the overall enhanced charge carrier density.

Up to this point, we have demonstrated the effective dielectric tuning offered by the tailorable nanostructure. The optical tunability demonstrated in this Au—TiN hybrid system comes from multiple factors. First, the well-aligned vertical Au nanopillars in TiN matrix platform presents very anisotropic light-matter interactions in vertical and lateral directions. This highly anisotropic hybrid system behaves differently from any of the two phases alone. Second, the strong interfacial coupling between the Au nanopillars and TiN matrix results in strong vertical strain coupling, enhanced optical anisotropy, effective charge carrier injection from Au to TiN and thus demonstrate effective tuning of optical property. Specifically, as the Au nanopillar density increases, the TiN matrix is more compressive out-of-plane; charge carrier density increases effectively, and therefore the hybrid system behaves more metallic optically. Further understanding on the interfacial charge carrier transfer mechanisms by density functional theory (DFT) calculations could be valuable for exploring the interfacial coupling between the Au nanopillars and the TiN matrix.

As Au nanoparticles (NPs) have been demonstrated as durable and effective chemical sensors, a potential application of the hybrid Au-nitride metasurfaces is bio and molecular sensing. As a demonstration, we have explored the sensitivity of selective binding efficiency of the low and high density Au-TIN films with target analytes (—OH). Results are shown in FIGS. 5a1, 5a2, 5a3, 5b1, 5b2, and 5b3 (where intensity vs. wavelength graphs showing application of chemical sensing is provided, demonstrating chemical sensing. Total internal reflection spectra are shown in FIGS. 5a1, 5a2, and 5a3 for low density Au-TIN film, while FIGS. 5b1, 5b2, and 5b3 shown high density Au—TiN film, showing the effectiveness of surface Au functionalization. Several steps are depicted in these figures. Step 1: methanol treated spectra, signature dips located at 3000 cm$^{-1}$ correspond to the —OH stretch bonded with dangling Au at metasurface; step 2: spectra taken after 24 h functionalization with MPA solution. The signature dips are disappeared due to the thiol bond reaction with —OH stretch; step 3: spectra of samples after 20 minutes UV exposure which serves to break the thiol bonds. The speed of this recovering process has a dependency on Au densities. First, the samples were washed with methanol (CH$_3$OH) solution before the FTIR spectra being collected, the reflection dips at near 3000 cm$^{-1}$ and their fingerprints (1500-500 cm$^{-1}$) are present and identified as the —OH stretch. The weak dip showing at about 3800 cm$^{-1}$ belongs to the free-standing-OH stretch. When the surface is only treated by Methanol (methanol will not bond with Au), all that can be seen is the methanol signature peaks. When the surface is bonded with thiol bond reaction in MPA solution (Au is functionalized with the thiol bond reaction), the OH bond signature peaks all disappeared suggesting the effective Au functionalization with MPA. In the last step of UV exposure, the functionalization will be broken and thus the OH signature peak will again show up in the FTIR measurement results. This shows un-functionalization of the Au surface and thus reusable Au surface. To prove the high potential of the Au nanopillars for sensing, the Au nanopillars were blocked by functionalizing the surface with thiol bonds in a 3-mercaptopropionic acid (MPA) solution for 24 hours, as the Au nanopillar surface undergoes a self-assembling reaction. Detailed processes are described in "Methods". As expected, the —OH stretching disappeared from the FTIR spectrum, with merely background noise in the corresponding spectrum region. In the final step, the samples were treated with UV light, aiming to break the thiol bonds from the functionalized surface, and the recovery of the —OH stretching of the uncovered Au nanopillars. Within 20 min exposure, the low density Au—TiN spectrum recovers almost to its original intensity while the high density Au sample recovers to about 50%. Therefore, the high potential for chemical sensing for the Au nanopillars at the hybrid plasmonic surface was demonstrated. In addition, the reliability and effectiveness of the Au-TIN hybrid films are confirmed by comparing with the spectra from pure TiN films, Au colloidal nanoparticles (NPs) and nanorods (NRs) samples. While TiN is not contributing to functionalization, it serves as a durable matrix to "stabilize" the well-distributed Au "nanoantenna" assemblies, such that the bonding is more effective and stronger signals are detected from the surface of the hybrid films. It is believed that both the plasmonic effect between the closely spaced Au—Au nanopillars and the bonding efficiency between the molecule and the Au nanopillars play the role in enhancing the FTIR signal. As compared to solution based plasmonic nanostructures, our Au—TiN hybrid plasmonic surfaces are mechanically strong and thermally robust and can be reused multiple times.

To further understand the enhanced plasmonic response of the Au—TiN hybrid metasurfaces, Raman spectra (FIG. 6a) were collected for pure TIN, low and high density Au—TiN films. Results show that the overall Raman signals are strengthened with the increased Au densities. As stated, enhanced Raman signals in the Au—TiN hybrid systems are believed to be related to the well-controlled Au inter-pillar spacing therefore stronger near field interactions. In addition, the first-order acoustic peaks (Table 1, see below), namely transverse acoustic (TA), longitudinal acoustic (LA), transverse optical (TO) and the second-order acoustic (2A) modes maintain comparable with varied Au densities and match with reported values of TiN. This provides a strong evidence of stable TiN stoichiometry such that the plasmonic tuning is realized by the hybrid geometry instead of a metal-semiconductor transition of TiNx.

In addition, the ability of plasmonic Au—TiN nanostructures to modify PL from molecules is important for potential fluorescence sensing implementation. To this end, a pure TiN and an Au—TiN sample were spin-coated with a fluorescent conjugated polymer thin film (about 10 nm), followed by PL imaging and spectroscopy. A fluorescent thin film on glass sample was also measured as a reference. The PL emission spectra of the three samples upon a 365 nm laser excitation are shown in FIGS. 6c-6d. Both plasmonic films exhibited a 10 nm blue shift as well as a sharper response (smaller FWHM) of emission peaks, as compared to glass. Meanwhile, there is an obvious fluorescence quenching attributed to LSPRs (enhanced carrier densities of the Au-TIN). This can be visualized from the PL images as shown in FIG. 6b whereby the plasmonic films result in weaker fluorescence from the conjugated polymer layer. On the other hand, comparing the two plasmonic films, there is a major PL enhancement by the Au—TiN hybrid compared to the TiN film alone, suggesting a plasmon-enhanced contribution to the fluorescence due to the presence of the Au nanopillars in TiN. The exploration of plasmonic metasurfaces and their functionalities is a first-step demonstration, more explicit studies incorporating such metasurfaces for nanophotonic device are under investigation.

TABLE 1

Peak position of first-order acoustic modes from Raman measurements

| Au at % | TA | LA | 2A | TO |
|---|---|---|---|---|
| 0 | 232.31194 ± 0.86804 | 311.25791 ± 0.42652 | 458.74409 ± 1.96543 | 579.29365 ± 2.74366 |
| 5 | 232.50029 ± 1.27455 | 313.12214 ± 0.58209 | 461.6699 ± 2.35424 | 576.41751 ± 2.81994 |
| 20 | 226.48521 ± 3.64098 | 311.70881 ± 2.29083 | 475.33719 ± 8.10779 | 595.83984 ± 8.59915 |

Self-assembled nanocomposite Au—TiN thin films were grown on single crystalline MgO (001) and c-cut sapphire (a-$Al_2O_3$) substrates. Deposition was carried on a pulsed laser deposition (PLD) system with KrF excimer laser (Lambda Physik Compex Pro 205, 1¼ 248 nm, 2-5 Hz). The laser beam was focused onto the target with an incident angle of 45° and an energy density of around 3.0 J $cm^{-2}$. Two-phase deposition is realized by pasting Au foil piece with a TiN target. The chamber was pumped to lower than $1.0 \times 10^{-6}$ mbar to provide a desired vacuum deposition condition. Substrate temperature was maintained at 600-700° C. Deposition rate was controlled by tuning temperature and substrate to target distance. After the deposition, the chamber was cooled to room temperature at 15° C. $min^{-1}$ under vacuum. Au NPs were prepared by the citrate reduction method, using gold chloride trihydrate ($HAuCl_4 \cdot 3H_2O$, ≥99.9%), and trisodium citrate dihydrate (USP testing specifications) at a molar ratio of 1:3.5; Au NRs were purchased from Nanopartz.

The microstructures of the films were characterized by X-ray diffraction (XRD) and transmission electron microscope (TEM), and scanning transmission electron microscope (STEM). XRD θ-2θ scans were performed on a Panalytical X'Pert X-ray diffractometer with Cu Kα radiation. Bright field TEM images, selected area electron diffraction (SAED) patterns and energy dispersive X-ray spectroscopy (EDS) chemical mapping were acquired by the FEI Talos F200X TEM. High resolution STEM was carried on a modified FEI Titan microscope with an hexapole-type illumination aberration corrector. The TEM samples were prepared using a standard cross-section sample preparation procedure, including manual grinding, polishing, dimpling and an ion milling step (PIPS 691 precision ion polishing system, 4.0 keV).

Normal incident depolarized transmittance (T %) and reflectivity (R %) spectra were measured using an optical spectrophotometer (Lambda 950 UV/Vis Spectrophotometer) with integrated sphere detector and total absolute measurement system (TAMS). Ellipsometry experiments were carried on a RC2 spectroscopic ellipsometer (J. A. WOOLLAM COMPANY). Three angles 30°, 45° and 60° and a spectrum range from 210-2500 nm were covered for the measurements.

The samples were submerged in 50 mM 3-mercaptopropionic acid (Sigma Aldrich) ethanolic solution for 24 hours at room temperature; after incubation, samples were washed with ethanol and DI water to remove any unreacted MPA. The successful Au-MPA self-assembling was demonstrated by irradiating the sample at a specific wavelength of 365 nm via a UV lamp UVGL-25, in order to break specifically the Au-thiol bonds formed. The functional group present before and after self-assembly were confirmed via ATR-FTIR spectroscopy using a Spectrum 100 FTIR Spectrometer (Perkin Elmer, Waltham, MA).

TiN and Au—TiN samples were coated with a fluorescent thin film before PL measurements. A fluorescent conjugated polymer poly(9,9-dioctylfluorene-alt-benzothiadiazole) (F8BT) was dissolved in chloroform to a concentration of 4.2 mg mL$^{-1}$ (6.3 mg of F8BT was dissolved in 1.5 mL of chloroform). The solution was heated in a water bath at 45° C. and simultaneously stirred at 5000 rpm for 15 min and then sonicated for 15 min. Finally, 50 mL of the F8BT solution was dynamically spin coated onto the samples at a spin speed of 5000 rpm for 60 seconds. The same spin coating conditions were also used to coat a cleaned glass substrate with F8BT. Prior to spin coating, the glass substrate was cleaned in an ultrasonic bath containing detergent (0.5 wt %; Sparkleen, Fischer Scientific) for 10 min., and, subsequently, in a $_{50:50}$ solution of hydrochloric acid and ethanol for 10 min. The substrate was triple rinsed in ultrapure water (Mili-Q) after each bath cleaning step. The bright-field/dark-field imaging was performed on an inverted microscope (AXIO VERT.A1, CARL ZEISS MICROSCOPY, LLC.) coupled to an imaging spectrometer (SHAMROCK SR303I-A, ANDOR TECHNOLOGY LTD.). Photoluminescence imaging and spectroscopy were carried out using an excitation source (X-Cite® 120Q, EXCELITAS TECHNOLOGIES CORP.) combined with a 365 excitation filter and a 397 nm long pass filter.

The Hall resistance of as-deposited films was measured by a standard four-point probe method using electrical transport option (ETO) mode of a physical property measurement system (PPMS, Quantum Design). The gold contact for electrical measurements was deposited by pulsed laser deposition (PLD) with an Au (>99.9% purity) target at room temperature.

Normal incidence transmittance and electric field map were simulated using COMSOL Multiphysics software. Wave Optics Module with frequency domain was applied. Optical constant (n and k) for pure TiN and Au was taken from fitted ellipsometry data of an 80 nm TiN film grown on MgO substrate, and a sputtered 200 nm Au film deposited on Ti buffered glass substrate, respectively. The optical model was built with dimensions of 80 nm film thickness supported on MgO substrate, nanopillar dimension and inter-pillar distances were matched with TEM results. A normal incidence depolarized electromagnetic field was applied with two ports on top and bottom of the model. Optical parameters (i.e. real and imaginary part of permittivity) are retrieved using the COMPLETEEASE software supported by J. A. WOOLLAM COMPANY, with film considered as a B-Spline layer. The averaged mean square error (MSE) of data fitting is 0.842, indicating a desired match between measurements and simulations.

Figure 7:
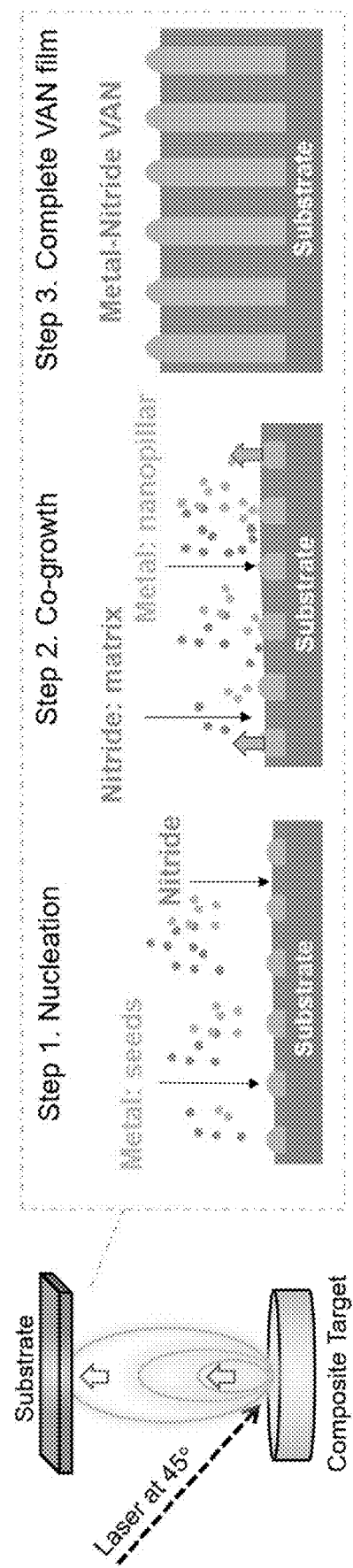
FIG. 7 is a schematic showing a method of the fabricating the metal-nitride vertically aligned nanocomposites, according to the present disclosure.

Referring to FIG. 7, a schematic is presented showing a method of the fabricating the metal-nitride vertically aligned nanocomposites. The Method includes applying a pulsed laser deposition (PLD) technique. Laser impinges onto the composite target (i.e., a two-phase Au-TIN plasmonic nanostructure) at 45° and adatoms of the composite target being deposited onto a heated substrate with nitride disposed thereon and metal seeds provided as small islands dispersed thereon, forming a nanocomposite thin film. Next nucleation occurs. Metal nucleates as small islands as seed layer, while nitride favors layered growth. The growth mode is largely determined by such factors as surface energy of materials, laser energy and frequency, and density distribution of the two-phase composite target. Next, the adatoms of metal and nitride phases stack on top of itself, without intermixing or diffusion. Next, complete VAN growth. Thickness can be controlled as desired by varying laser energy and frequency and density of the two-phase composite target.

Various material choices for Nitride includes TiN, TaN, ZrN, GaN, AlN, and HfN; for Metal includes Au, Ag, Pt, Ni, Co, Cu, Fe, and Al; and for Substrate includes single crystalline oxide substrates such as $SrTiO_3$, $LaAlO_3$, $Al_2O_3$, MgO, Si, glass, and mica. Dimension range for pillar diameter are between about 2 and about 20 nm in diameters, between about 5 nm to about 1 um in length. Growth parameters include vacuum to 200 mtorr of background pressure, and a temperature of between about 600 to about 800° C., laser energy of between about 350 mJ to about 450 mJ, 2nd phase density of between about 5 to about 50% of secondary phases film thickness with about 5 nm to about 1 um in thickness. Density of the nanorods is defined by interspacing between these nanorods. The spacing of nanorods includes a range of about 4 nm and about 6 nm (spacing from pillar edge to pillar edge). The nanorods of the present disclosure can have an aspect ration (height/diameter) of between about 1:1 to about 200:1.

Figures 8A, 8B, 8C, 8D, 8E:
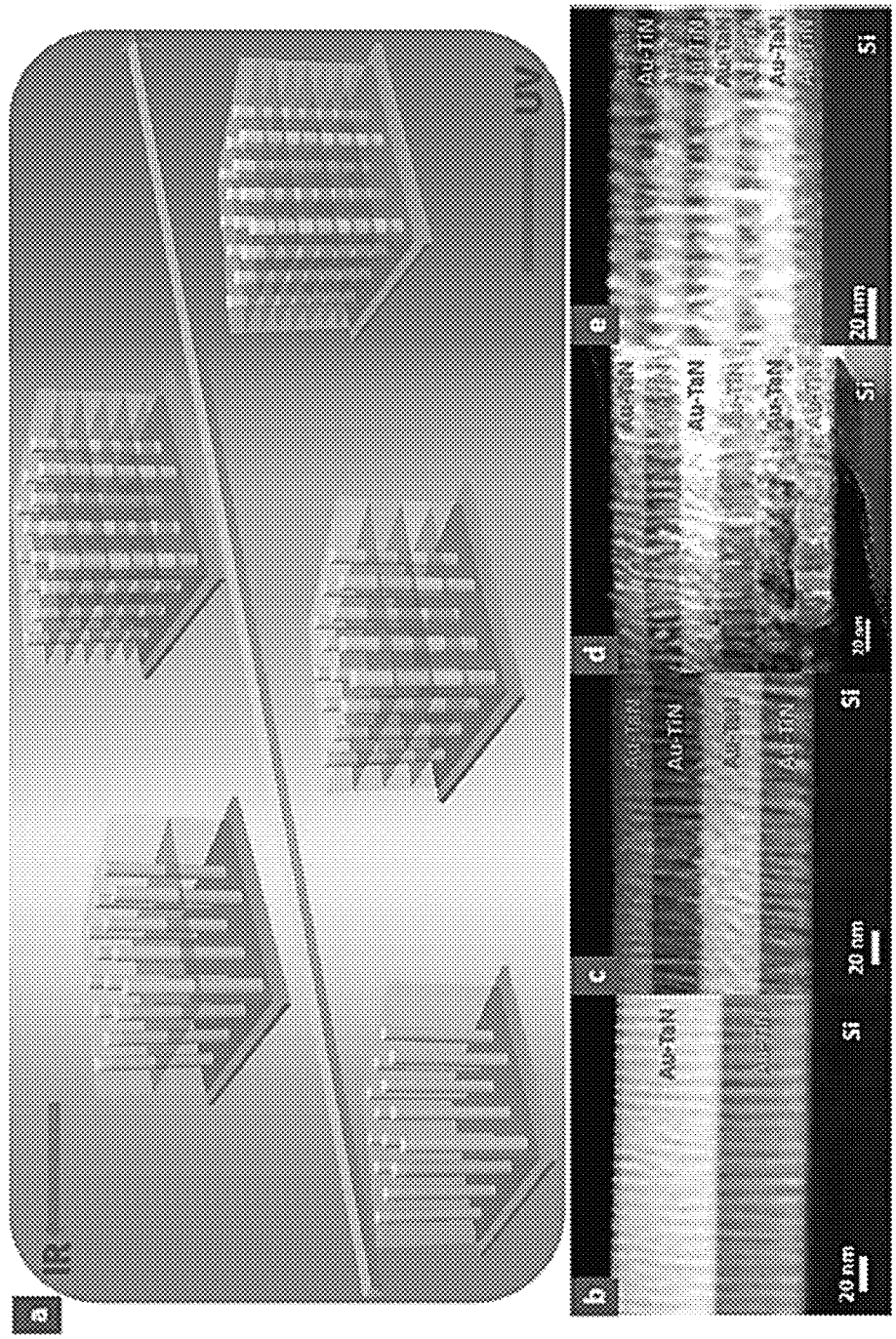
FIGS. 8a-8e provide a design of the Au-nitride multilayer nanostructure, according to a second embodiment of the present disclosure.

The second embodiment of the nanostructures of the present disclosure is described in reference to FIGS. 8a, 8b, 8c, 8d, 8e, 9a, 9b, 9c, 9d, 9e, 9f, 9g, 9h, 9i, 10a, 10b, 10c, 10d, 11a, 11b, 11c, 11d, 11e, and 11f. Referring to FIGS. 8a-8e, a design of the Au-nitride multilayer nanostructure is shown. FIG. 8a is a schematic illustrations to show the design of multilayers with Au nanowires on Si. STEM images of the design shown in FIG. 8a are provided in FIGS. 8b for Au—TaN/Au-TIN multilayer, FIG. 8c for Au—TaN/Au-TIN×2 multilayer, FIG. 8d for Au—TaN/Au—TiN×3 multilayer, and FIG. 8e for Au—TaN/Au-TIN×4 multilayer, all of which are shown on Si as the substrate.

As discussed above, no limitation is intended by the material choice of Au, Ti, Ta, or Si. Various material choices for Nitrides include TiN, TaN, ZrN, GaN, AlN, and HfN; while various material choices for metals include Au, Ag, Pt, Ni, Co, Cu, Fe, and Al; and various material choices for Substrate include single crystalline oxide substrates such as SrTiO3, LaAlO3, Al2O3, MgO, Si, glass, and mica.

The overall density of the nanopillars is determined by the metal (e.g., Au) composition (density). The substrates will make the arrangement of pillars slightly different and the epitaxial quality of the pillars will be altered. For example, $Al_2O_3$ is hexagonal in crystal structure and it will favor a 3 fold or 6 fold symmetry rather than the 4 fold symmetry on MgO substrate.

The number of the TaN/TiN multilayers, according to this second embodiment, was varied from 1, 2, 3, to 4, while the total thickness of all the films were kept almost the same (about 80 nm) with the purpose to maintain a smooth film surface and uniform coverage, since thicker films might increase overall surface roughness and thinner films might be discontinuous in surface coverage. Such 3D structure are confirmed in the scanning transmission electron microscopy (STEM) images in FIGS. 8b-8e. In such 3D metamaterials, the thermally stable nitrides (TiN and TaN) encapsulate Au nanopillars to overcome the poor thermal and chemical stability of metals. TiN is considered as an alternative plasmonic material to noble metals, with much better thermal stability in vacuum. It is noted that previous study has suggested that Au might be more thermally stable in air than TiN. TiN grown under low temperature is CMOS compatible. Furthermore, epitaxial TiN thin film has been previously reported grown on Si substrate by domain epitaxial matching, that is, 4 of TiN (002) match with 3 of Si (004) to overcome the very large lattice mismatch (f of about 24%).

Figures 9A, 9B, 9C, 9D, 9E, 9F, 9G, 9H, 9I:
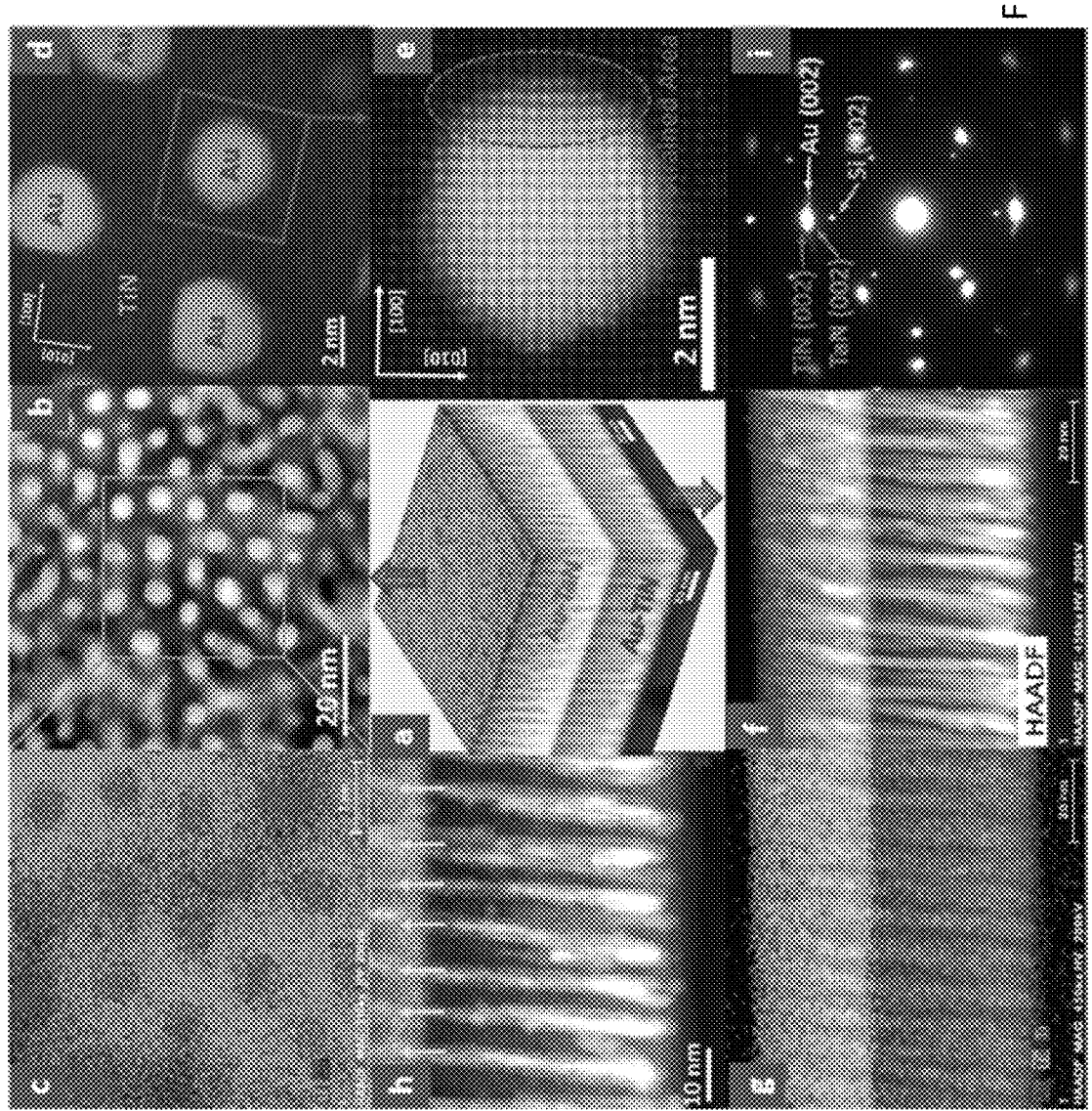

All the multilayer samples have been deposited with similar total thickness, as designed and illustrated in the low-mag cross sectional STEM images in FIGS. 8b-8e. The STEM images present the well-defined multilayer structures, with well separated Au-TIN and Au—TaN layers. To further explore the microstructure of the films, the Au—TaN/Au-TIN bilayer sample is selected for a detailed investigation. The overall 3D nature of the sample is evidenced by the cross-sectional and plan-view transmission electron microscopy (TEM) images in FIG. 9a (a 3D-diagram generated by plan-view and cross sectional STEM images). The vertically aligned Au nanopillars (having a diameter of about 3 nm) are grown straight throughout both layers and uniformly distributed in the nitride matrix. The growth mechanism of such vertically aligned nanocomposite structure has been discussed in a previous report and has also been realized in metal-oxide systems. Au nanopillars passed through the multilayer structure with very good registry. This results in a very interesting 3-phase nanocomposite framework combining the vertical Au nanopillars and the lateral multilayer structures. FIG. 9b exhibits the plan-view STEM image (in high angle annular dark field [HAADF] mode) in a typical area, and FIG. 9c shows the corresponding energy-dispersive X-ray spectroscopy (EDS) elemental mapping of a selected area. Au nanopillars are uniformly distributed in the TiN matrix, noting that this plan-view TEM specimen is ion milled into the bottom layer of Au-TIN. FIG. 9d presents a high-resolution STEM image to show the high quality of the film and the size of the Au nanopillars can be identified to be as small as about 3 nm. Such fine Au nanopillar structure could be hard to achieve by other templated methods, such as alumina template growth, or other direct top-down nanofabrication methods, such as focused ion beam (FIB) or e-beam writer. High-resolution TEM image of a representative Au nanopillar shown in FIG. 9e further presents high epitaxial quality of the film with very limited defects, and obvious strain contour has been generated at the nitride/Au interface area to compensate the lattice mismatch (4.43% between Au and TiN). The low-mag cross-sectional STEM image and its corresponding EDS mapping in FIGS. 9f and 9g further confirm the vertical growth of Au nanopillars in both Au-TIN and Au—TaN layers. Taking a close look at the interlayer area in FIG. 9h, the continued growth of Au nanopillars can be identified from layer to layer, suggesting the preferred nucleation of Au pillars in TiN matrix. The selected area electron diffraction (SAED) pattern in FIG. 9i exhibits distinguished Au (002), TiN (002), and TaN (002) diffraction dots, which is consistent with the XRD results and further confirms the high quality of the film.

Figures 10A, 10B, 10C, 10D:
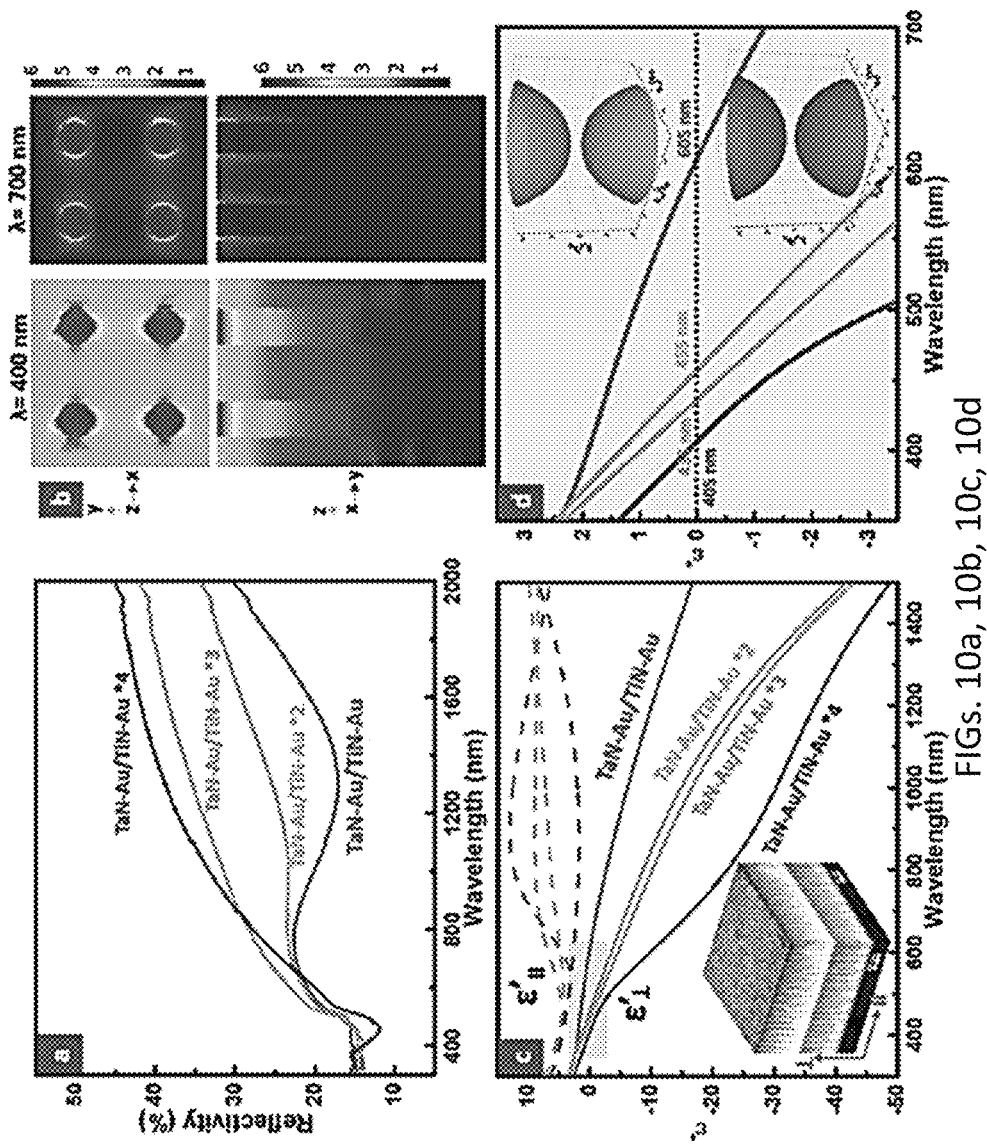
FIGS. 10a-10d provide optical properties of the Au-nitride multilayer thin films of the second embodiment of the nanocomposite structure according to the present disclosure, where FIG. 10a provides a reflectivity measurements of the multilayer thin films in the wavelength range of 300-2000 nm, FIG. 10b provides a 2D electric field (Ex) distribution on the TaN-Au/TiN-Au film on Si at wavelength of 400 nm (close to resonant frequency) and 700 nm, FIG. 10c provides the real part of the dielectric function using uniaxial fitting to derive different permittivity in the directions parallel or perpendicular to the film surface, and FIG. 10d provides an enlargement of the $\lambda_0$ region to determine $\lambda_0$ value.

The unique Au nanopillar-multilayer intercalated structure with high epitaxial quality gives rise to large flexibility in nanostructure designs and thus extraordinary optical properties. Reflection measurement was first carried out on all the multilayer samples to demonstrate the plasmonic behavior. FIG. 10a presents reflectivity spectra in the wavelength range from 300 to 2000 nm, and all the multilayer films exhibit high absorbance (higher than 75%), and reflectivity of about 25% or lower throughout the visible wavelength regime of 380-740 nm (here the transmittance of the films is negligible in the visible regime). Furthermore, an obvious absorption centered at about 450 nm is observed due to the plasmon resonance of Au nanopillars. In the near infrared regime, the reflection basically increases with increasing wavelength for all the multilayers. COMSOL Multiphysics Wave Optics Module was applied to simulate the optical spectra of the selected Au—TaN/Au—TiN film, and the corresponding electric field maps at 400 and 700 nm have been generated, as shown in FIG. 10b. At 400 nm, a strong field enhancement has been observed, primarily localized at the Au-air interface, Au-nitride interface as well as inside the Au nanopillar. However, at 700 nm, weak field excitation has been observed only in the Au-nitride interface area. Considering the ultra-fine (3 nm) Au nanopillars, further explorations taking quantum effect into account for optical studies are of great interest.

Optical properties of the Au-nitride multilayer thin films are described in FIGS. 10a-10d. FIG. 10a provides a reflectivity measurements of the multilayer thin films in the wavelength range of 300-2000 nm. FIG. 10b is a 2D electric field (Ey) distribution on the TaN—Au/TiN—Au film on Si at wavelength of 400 nm (close to resonant frequency) and 700 nm. Models are built based on its actual geometry from TEM images, normal incident depolarized beam is applied. FIG. 10c provides the real part of the dielectric function using uniaxial fitting to derive different permittivity in the directions parallel or perpendicular to the film surface. FIG. 10d provides an enlargement of the $\lambda_0$ region to determine $\lambda_0$ value. Insets are the extracted iso-frequency surfaces of the TaN-Au/TiN-Au and TaN—Au/TiN—Au*4 films at 500 nm; $k_0$=w/c is the wavenumber in vacuum; $k_x$, $k_y$, and $k_z$ are the [100], [010], and components of the wavevector, respectively.

Figures 11A, 11B, 11C, 11D, 11E, 11F:
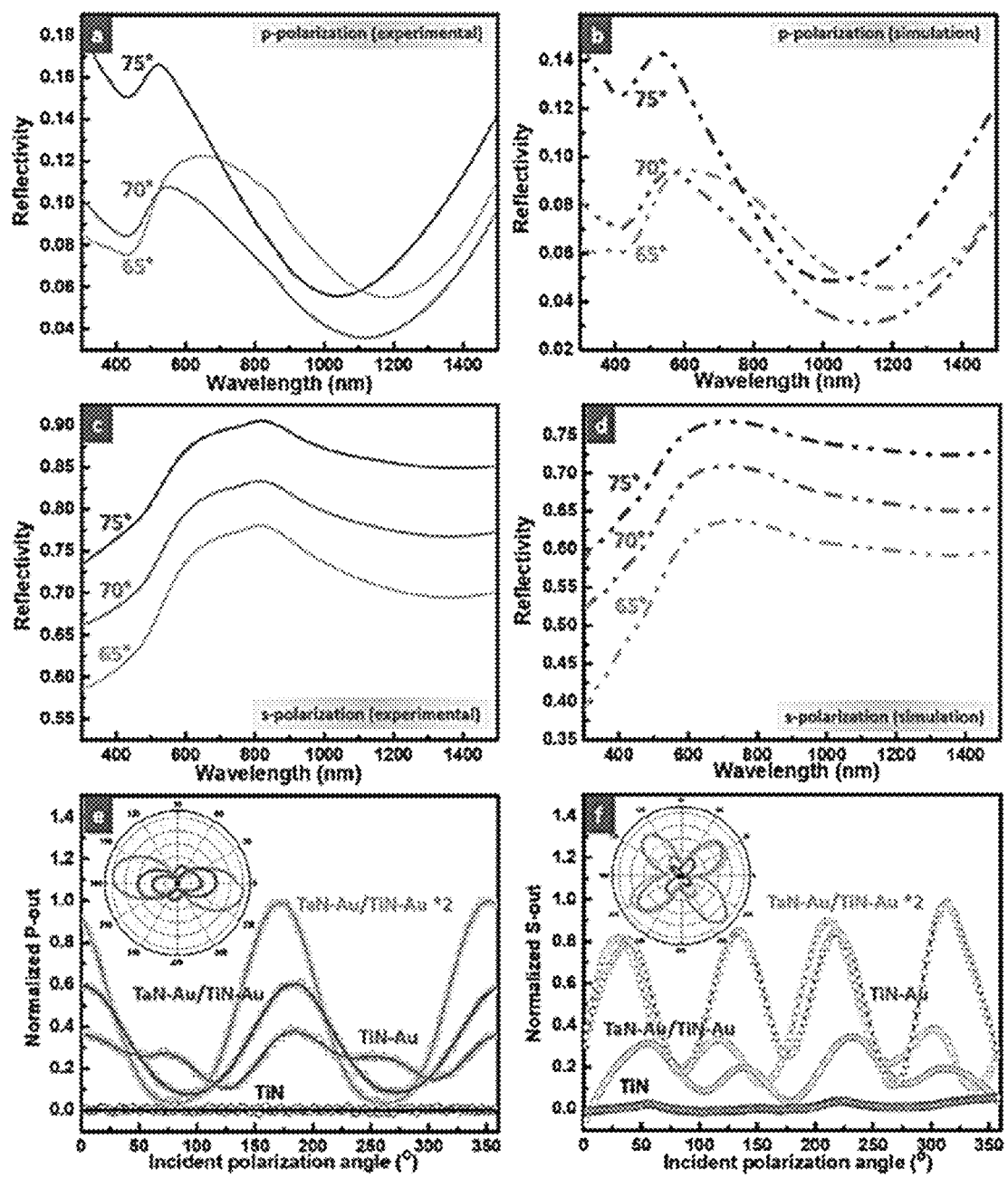
FIGS. 11a-11f provide experimental and simulated reflectivity and nonlinear optical response of the Au-nitride multilayer thin films, where reflectivity spectra of the Au—TaN/Au—TiN film on Si for different angles of incidence are provided in FIG. 11a for p-polarized and 11c for s-polarized incident lights, simulated reflectivity spectra are provided in FIG. 11b for p-polarized and in FIG. 11d for s-polarized incident light, normalized SHG intensity as a function of incident polarization angle with output polarization fixed at e 0° (P-out) is shown in FIG. 11e and shown in FIG. 11f at 90° (S-out).

FIGS. 11a-11f provide experimental and simulated reflectivity and nonlinear optical response of the Au-nitride multilayer thin films. Reflectivity spectra of the Au—TaN/Au—TiN film on Si for different angles of incidence are provided in FIG. 11a for p-polarized and 11c for s-polarized incident lights. Simulated reflectivity spectra are provided in FIG. 11b for p-polarized and in FIG. 11d for s-polarized incident light. Normalized SHG intensity as a function of incident polarization angle with output polarization fixed at e 0° (P-out) is shown in FIG. 11e and shown in FIG. 11f at 90° (S-out). The insets are their corresponding polar plots of measured SHG intensity versus incident polarization angle.

Those having ordinary skill in the art will recognize that numerous modifications can be made to the specific implementations described above. The implementations should not be limited to the particular limitations described. Other implementations may be possible.

The invention claimed is:

1. A multilayer plasmonic nanocomposite structure, consisting of:
   a substrate; and
   alternating metal nitride layers ranging from four alternating nitride layers to eight alternating nitride layers disposed on the substrate, each layer consisting of a metal nanopillar of a predetermined length directly embedded in an alternating nitride, wherein each of the alternating metal nitride layers is selected from the group consisting of TiN, TaN, ZrN, GaN, AlN, HfN, and a combination thereof.

2. The multilayer plasmonic nanocomposite structure of claim 1, wherein the substrate includes a nitride layer disposed thereon with metal seeds provided as small islands dispersed over the substrate.

3. The multilayer plasmonic nanocomposite structure of claim 1, wherein the metal includes one or more of Au, Ag, Pt, Ni, Co, Cu, Fe, Al, and a combination thereof.

4. The multilayer plasmonic nanocomposite structure of claim 1, wherein the substrate includes a single crystalline oxide substrate which includes one or more of SrTiO3, LaAlO3, Al2O3, MgO, Si, glass, mica, and a combination thereof.

5. The multilayer plasmonic nanocomposite structure of claim 1, wherein each of the at least three alternating metal nitride layers is a vertically aligned metal nitride nanocomposite each nanocomposite with a predetermined size of a diameter of between about 2 and about 20 nm, a length of between about 2 nm to about 1 µm, and an interspacing between about 4 nm to about 6 nm.

* * * * *